(12) United States Patent
Jeppsen et al.

(10) Patent No.: US 11,533,993 B2
(45) Date of Patent: Dec. 27, 2022

(54) MODULAR FURNITURE UNIT FOR ASSEMBLY BY A WEDGE

(71) Applicant: LARSANDPETER APS, Copenhagen (DK)

(72) Inventors: Lars Jeppsen, Rødvig (DK); Peter Minor, Copenhagen (DK)

(73) Assignee: LARSANDPETER APS, København (DK)

( * ) Notice: Subject to any disclaimer, the term of this patent is extended or adjusted under 35 U.S.C. 154(b) by 339 days.

(21) Appl. No.: 16/491,389

(22) PCT Filed: Nov. 29, 2017

(86) PCT No.: PCT/EP2017/080775
§ 371 (c)(1),
(2) Date: Sep. 5, 2019

(87) PCT Pub. No.: WO2018/162105
PCT Pub. Date: Sep. 13, 2018

(65) Prior Publication Data
US 2021/0267364 A1 Sep. 2, 2021

(30) Foreign Application Priority Data
Mar. 8, 2017 (EP) .................................... 17159783

(51) Int. Cl.
*A47B 57/34* (2006.01)
*A47B 47/00* (2006.01)

(52) U.S. Cl.
CPC .......... *A47B 57/34* (2013.01); *A47B 47/0091* (2013.01)

(58) Field of Classification Search
CPC ... F16B 12/24; A47B 47/042; A47B 47/0091; A47B 57/34; A47B 96/024; A47B 96/1416
See application file for complete search history.

(56) References Cited

U.S. PATENT DOCUMENTS

| 1,182,610 A | 5/1916 | Wiesman |
| 2,366,676 A * | 1/1945 | Rosenthal ............ A47B 47/042 108/180 |

(Continued)

FOREIGN PATENT DOCUMENTS

| CN | 104739061 A | 7/2015 |
| DE | 2034570 A1 | 2/1972 |

(Continued)

*Primary Examiner* — Stanton L Krycinski
(74) *Attorney, Agent, or Firm* — Dinsmore & Shohl, LLP

(57) ABSTRACT

The invention regards a wedge for assembling a furniture unit, a kit of parts for a modular shelving unit, and a modular shelving unit for assembly without tools, wherein the wedge is a T-shaped wedge for assembling a furniture unit, comprising: a rectangular plate, wherein the edges of the plate define a length direction and a width direction, a trapezoid plate, superimposed on the rectangular plate such that a first parallel edge of the trapezoid plate is adjacent to a first width edge of the rectangular plate, and wherein the non-parallel edges are symmetrically tapered along the length direction and in the direction away from the first width edge, and a beam, placed at the first width edge, thereby forming the T-shape, wherein the wedge is configured for frictionally engaging two planes within the furniture unit.

19 Claims, 18 Drawing Sheets

(56) References Cited

U.S. PATENT DOCUMENTS

| | | | | |
|---|---|---|---|---|
| 2,595,002 | A * | 4/1952 | Schneider | A47F 5/116 108/101 |
| 2,825,101 | A * | 3/1958 | Rubenstein | A47B 47/042 403/217 |
| 3,033,635 | A * | 5/1962 | Glass | A47B 87/02 312/351.3 |
| 3,403,641 | A * | 10/1968 | Baker | F16B 12/26 108/152 |
| 3,788,700 | A * | 1/1974 | Wartes | A47B 85/00 297/440.13 |
| 4,082,389 | A * | 4/1978 | Stewart | A47B 43/04 312/258 |
| 4,140,065 | A * | 2/1979 | Chacon | A47C 4/021 108/156 |
| 4,153,311 | A * | 5/1979 | Takahashi | A47B 47/042 312/107 |
| 4,169,639 | A * | 10/1979 | Zola | A47B 47/04 108/180 |
| 4,191,113 | A * | 3/1980 | Hogberg | A47C 4/021 108/157.16 |
| 4,408,812 | A * | 10/1983 | Krautwurst | A47B 57/34 108/107 |
| 4,542,831 | A * | 9/1985 | Dazza | A47K 1/05 108/42 |
| 4,817,809 | A * | 4/1989 | Rozmestor | B25B 13/56 206/503 |
| 5,279,232 | A * | 1/1994 | Gollick | F16B 12/24 108/109 |
| D362,771 | S * | 10/1995 | Gollick | D8/382 |
| 5,454,331 | A * | 10/1995 | Green | A47B 47/042 108/180 |
| 5,707,033 | A | 1/1998 | Holt et al. | |
| 6,634,511 | B2 * | 10/2003 | Manghera | A47B 47/042 108/180 |
| 6,732,444 | B2 * | 5/2004 | Allen | B23Q 35/102 144/372 |
| 6,752,464 | B1 | 6/2004 | Tseng | |
| 7,533,940 | B1 * | 5/2009 | Zook | A47B 83/02 297/440.13 |
| 7,914,091 | B1 * | 3/2011 | Joyce | F16B 12/125 312/263 |
| 8,517,189 | B2 * | 8/2013 | Donohoe | A47B 47/042 211/90.04 |
| 8,651,296 | B2 * | 2/2014 | Beaty | A47B 47/042 211/135 |
| 8,651,297 | B2 * | 2/2014 | Beaty | A47F 5/116 211/135 |
| 8,651,298 | B2 * | 2/2014 | Beaty | A47B 47/042 211/135 |
| 9,909,604 | B1 * | 3/2018 | Fawcett | F16B 12/125 |
| 10,085,553 | B2 * | 10/2018 | Funfgeld | F16B 12/44 |
| 10,897,993 | B2 * | 1/2021 | DeSmet | F16B 5/0032 |
| 2011/0260592 | A1 * | 10/2011 | Lin | F16B 12/125 312/265.5 |
| 2012/0152876 | A1 * | 6/2012 | Stroud | A47B 47/042 211/153 |
| 2013/0062294 | A1 * | 3/2013 | Beaty | A47B 47/042 211/59.2 |
| 2013/0062299 | A1 * | 3/2013 | Beaty | A47F 5/116 211/153 |
| 2014/0048176 | A1 * | 2/2014 | Susnjara | A47B 47/042 144/344 |
| 2014/0339969 | A1 * | 11/2014 | Nielsen | A47B 87/0292 312/111 |

FOREIGN PATENT DOCUMENTS

| | | | | |
|---|---|---|---|---|
| DE | 3411598 | A1 * | 10/1985 | F16B 12/24 |
| DE | 4313895 | A1 | 11/1994 | |
| DE | 20114161 | U1 | 3/2002 | |
| DE | 202005002790 | U1 | 6/2006 | |
| DE | 102011000546 | A1 * | 8/2012 | A47B 57/34 |
| EP | 0121487 | A1 | 10/1984 | |
| EP | 3045088 | A1 | 7/2016 | |
| FR | 1427575 | A | 2/1966 | |
| FR | 2406976 | A1 * | 5/1979 | A47B 47/042 |
| GB | 899579 | A * | 6/1962 | A47B 95/00 |
| GB | 1087401 | A | 10/1967 | |
| KR | 200436451 | Y1 * | 8/2007 | |

* cited by examiner

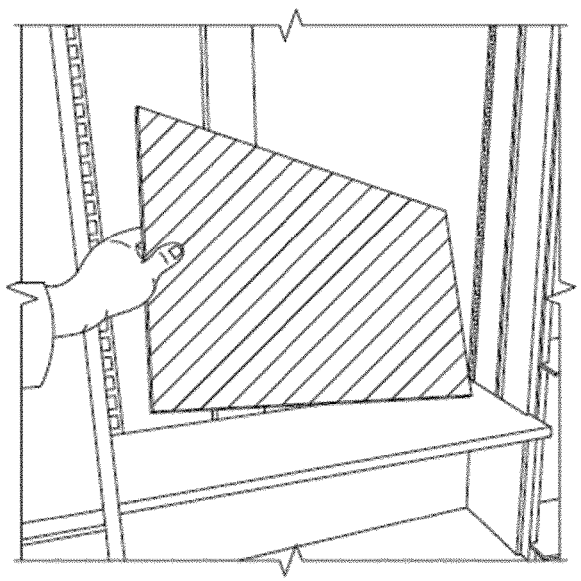
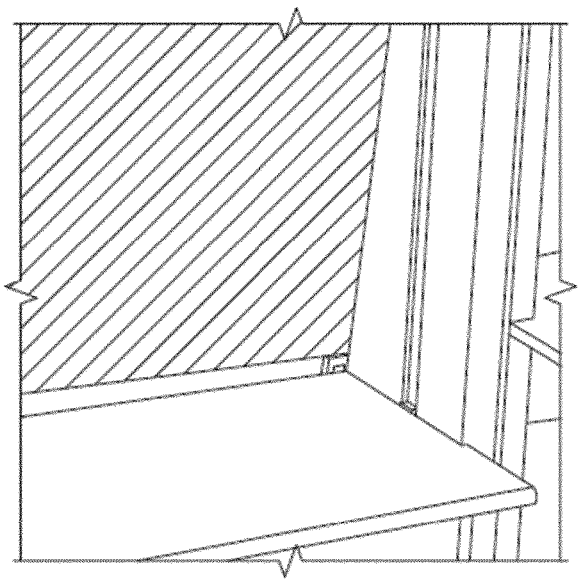
FIG. 4A  FIG. 4B
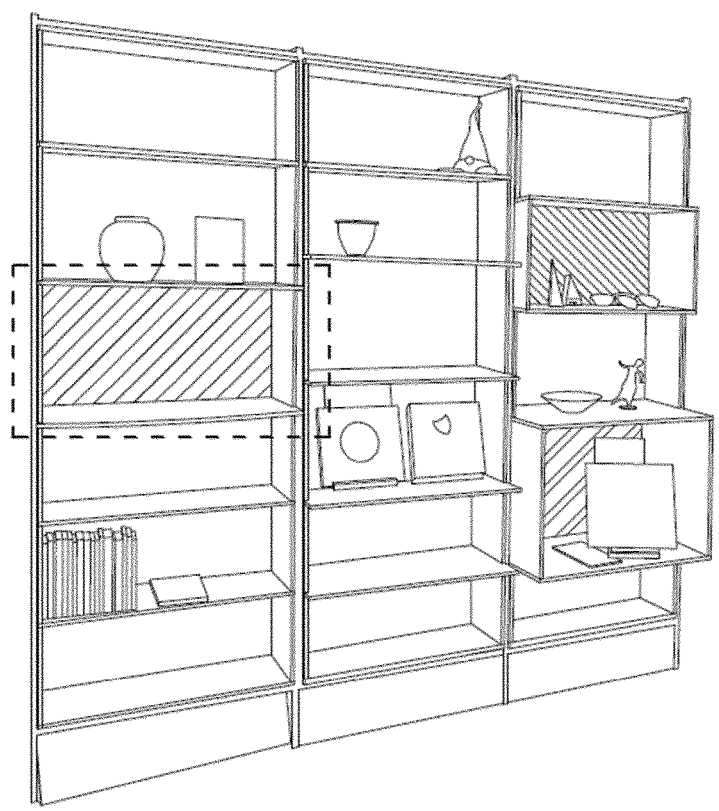
FIG. 4C

MODULAR FURNITURE UNIT FOR ASSEMBLY BY A WEDGE

CROSS-REFERENCE TO RELATED APPLICATIONS

This application is the U.S. national stage of PCT/EP2017/080775 filed Nov. 29, 2017, which claims priority of European Patent Application 17159783.4 filed Mar. 8, 2017 each of which is hereby incorporated by reference in its entirety.

FIELD OF INVENTION

The present invention relates to a wedge for assembling a modular unit, in particular a modular furniture unit, a kit of parts for a modular shelving unit, and a modular shelving unit for assembly without tools.

BACKGROUND OF INVENTION

Modular furniture that are partly or fully assembled at the place of use are becoming increasingly popular, and have the benefit of the furniture parts being easy to store and transport, as well as being possible to reuse by disassembly and reassembly at another place.

However, modular furniture may also entail that the furniture is assembled by a user, who is inexperienced in assembling furniture. It is therefore advantageous that the assembly is simple in structure, and requiring a minimum of different parts. Further it is advantageous that the furniture may be assembled, disassembled and/or reassembled readily in a minimum amount of time. User safety considerations further require that the assembled or reassembled furniture will form a stable and robust construction.

To improve the assembly simplicity and user-friendliness, modular furniture that may be assembled without the use of tools have been suggested. For example any type of frames, such as frames for shelves, beds, chairs and tables, may be assembled by use of wedges or similar biasing members instead of the use of tools. A wedge is slidably received within an aperture or groove formed between two fixed planes, and when the wedge frictionally engages with the aperture, it securely connects the two planes. Thus, the two planes are fixed relative and securely connected to each other by the compressive force acting perpendicular to the sliding plane of the wedge.

The stability of shelves systems is essential for a safe use. A shelves system that may be assembled without tools is disclosed in DE 201 14 161 U1 [1]. The described system comprises connecting members that support the horizontal shelf plate, and is further connecting the shelf plate to a vertical side plate. The connecting member consists of a first notch to be notch-and-grooved engaged with the horisontal shelf plate, and a second notch to be notch-and-groove engaged with the vertical side plates. The groove of the vertical side plates may be conically shaped.

Despite the advances to improve the simplicity and stability of modular furniture, and especially shelves systems, there is a need for more simple, flexible, stable, and robust modular furniture.

SUMMARY OF INVENTION

The present invention provides a wedge, a kit of parts, and a modular shelving unit for assembling a furniture unit, optionally without the use of further tools. The invention provides a simple assembly of a modular furniture unit, or other modular products assembled from parts, wherein the parts may have any size.

The invention further provides a simple assembly of a modular shelving unit of any size. The invention provides a high flexibility with respect to sizing of the shelf modules, as well a simple assembly using a minimum of different components. Thus, a unit comprising shelf modules of any height, depth and width, and combinations thereof, may be easily assembled by use of only one type of connection components, i.e. the wedge according to the invention.

The invention further provides a wedge, which facilitate a more simple and flexible assembly and/or disassembly and/or reassembly of any parts. Furthermore, the wedges of the invention facilitate an assembled structure that may be made stable and robust, and where the risk of accidental collapse of the structure is reduced.

A first aspect of the invention relates to a T-shaped wedge for assembling a furniture unit, comprising:
  a rectangular plate, wherein the edges of the plate define a length direction and a width direction, one of said edges being the first width edge,
  a trapezoid plate, superimposed on the rectangular plate such that a first parallel edge of the trapezoid plate is adjacent to the first width edge of the rectangular plate, and wherein the non-parallel edges of the trapezoid plate are symmetrically tapered along the length direction and in the direction away from the first width edge, and
  a beam, placed at the first width edge, thereby forming the T-shape, wherein the wedge is configured for frictionally engaging two planes within the furniture unit.

A second aspect of the invention relates to a kit of parts for a modular shelving unit, comprising:
  a) a plurality of frame plates configured to be assembled to form a rectangular outer frame, wherein the inner surface of at least a part of the vertical outer frame plates comprises a first vertical groove,
  b) one or more shelf modules, each shelf module configured to be assembled to form a horisontal shelf within said outer frame, each shelf module comprising:
    two vertical side plates, configured to be placed opposite each other, and against opposite vertical inner surfaces of the outer frame,
    a horisontal shelf plate configured to be placed on top of the two vertical side plates in a first notch-and-groove engagement with the adjacent vertical side plates, said shelf plate further comprising a second notch at each end of the shelf plate, and
  c) two or more wedges of the first aspect of the invention,
    wherein the modular shelving unit is configured to be assembled by installation of two or more wedges according to the first aspect of the invention.

A third aspect of the invention relates to a modular shelving unit for assembly without tools, comprising:
  a) a plurality of frame plates configured to be assembled to form a rectangular outer frame, wherein the inner surface of at least a part of the vertical outer frame plates comprises a first vertical groove,
  b) one or more shelf modules, each shelf module configured to be assembled to form a horisontal shelf within said outer frame, each shelf module comprising:
    two vertical side plates, configured to be placed opposite each other, and against opposite vertical inner surfaces of the outer frame, a horisontal shelf plate configured to be placed on top of the two vertical side plates in a first notch-and-groove engagement with the adjacent vertical side plates, said shelf plate further comprising a second notch at each end of the shelf plate, two wedges configured to be received within the apertures formed at each end of the shelf plate between the first vertical groove of the outer frame plate and the second notch at the end of the shelf plate, wherein the modular shelving unit is configured such that the installation of the wedges in the apertures displaces the horisontal shelf plate in the horisontal direction transverse to the width of the shelving unit, thereby stabilising the shelf module by compressing the horisontal shelf plate against the outer frame.

The presently disclosed principle of using a wedge, e.g. with a trapezoid plate, for assembling a modular unit without tools can also be applied to other furniture systems than shelve units. The principle can even be applied to any modular unit needing assembly, e.g. temporary housing facilities, etc.

DESCRIPTION OF DRAWINGS

The invention will in the following be described in greater detail with reference to the accompanying drawings.

FIG. 2: shows an embodiment of assembly and fixing shelf modules within an outer frame. FIGS. 2A-B further show a side plate in position before assembly.

FIG. 3: shows an embodiment of assembly and fixing shelf modules on top of each other.

FIG. 4: shows an embodiment of a shelf module with a back plate according to the invention. (A) shows the back plate immediately before assembly, and the vertical frame plate is seen to comprise an edge extending orthogonally from frame plate, seen as the metallic orthogonal supports, (B) shows the back plate during assembly, where the back plate is vertically orientated by being supported by the orthogonal supports, and (C) shows a shelving unit with an assembled back plate indicated by dotted line.

In FIG. 6, the width of the shelving unit corresponds to the length of shelf plate. Upon complete installation of the wedge, the shelf plate is compressed against the orthogonal support, as indicated by the arrow in FIG. 6D.

DETAILED DESCRIPTION OF THE INVENTION

Figure 1:
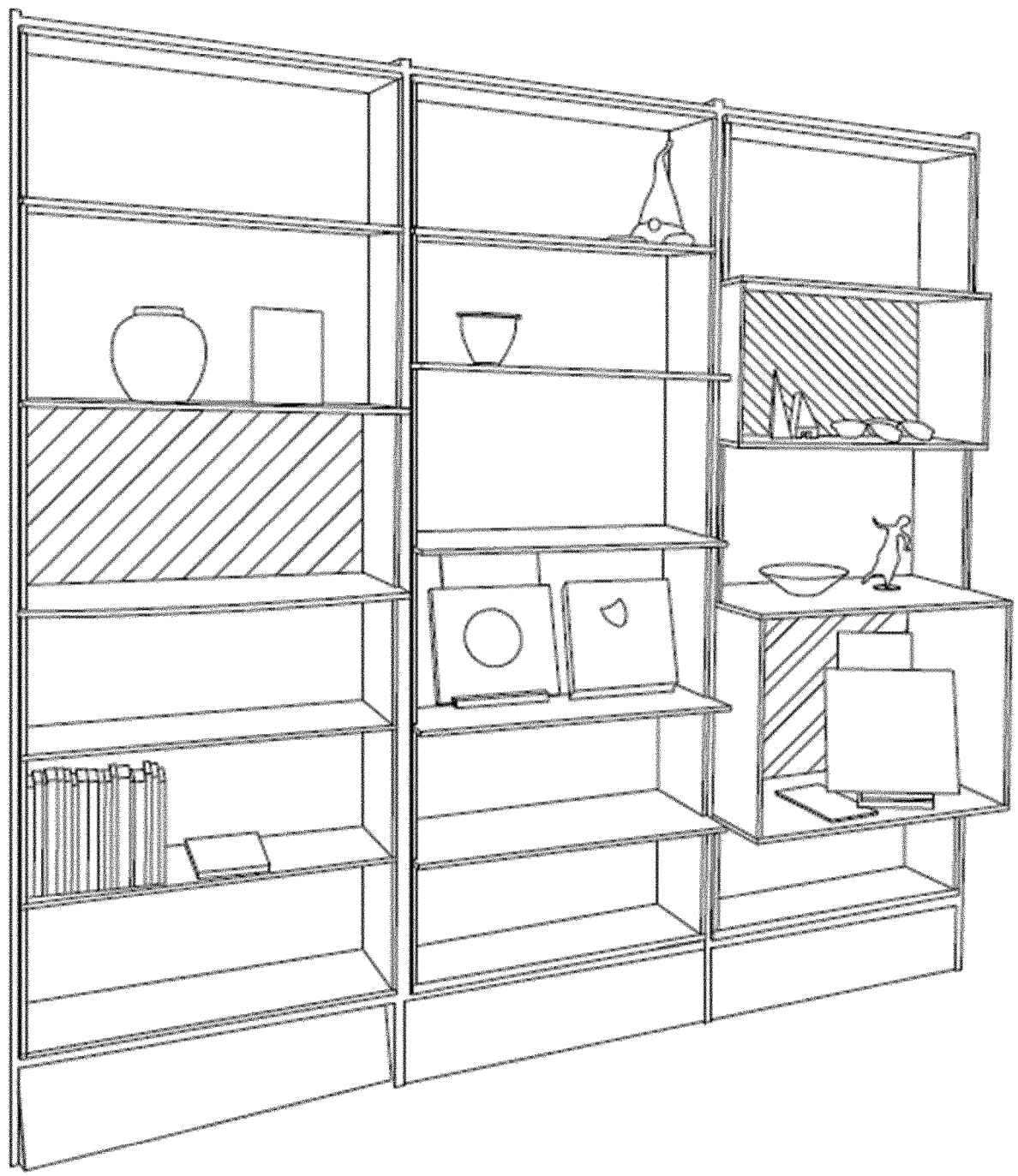
FIG. 1: shows an embodiment of a shelving unit according to the invention.

An embodiment of a modular shelving unit according to the invention is shown in FIG. 1. In this embodiment, the shelving unit comprises three outer frames, where the frames are seen as having darker colours. The three outer frames are placed adjacent and abutting each other in the width direction of the shelving unit. Thus, a shelving unit of any size, both in vertical height and lateral width, may be made. The height will be defined by the length of the vertical outer frame plates, and the width will be defined by the length of the horisontal outer frame plates, as well as the number of outer frames placed next to each other. Examples of height of the outer frame includes 210, 230, and/or 250 cm, and the width of the outer frame may for example be 60 cm.

As seen in FIG. 1, each outer frame comprises multiple shelf modules having a rectangular box shape, where each shelf module comprises two vertical side plates and two horisontal shelf plates, where one or both of the shelf plates are shared with the module above and/or below. The side plates and shelf plates are seen as the plates of lighter colour in FIG. 1.

Thus, shelf modules of any height and any depth may be obtained by using differently dimensioned side plates and shelf plates. The dimensions of the side and shelf plates may further be chosen independently of the dimensions of the frame plates. For example, the outer frame furthest to the right in FIG. 1 comprises five shelf modules, with three different shelf depths. The second module from the bottom has the bigger shelf depth, the fourth module from the bottom has a smaller shelf depth, and the first, third, and fifth module from the bottom have a shelf depth corresponding to the width of the outer frame plates.

FIG. 1 also shows shelf modules having a back plate, i.e. a plate forming a solid back within the shelf depth of a module. The back plate may have different colours as shown in FIG. 1, where the outer frame furthest to the right comprises shelf modules with three different colours of the back plate, i.e. grey, red, and wood-coloured.

Due to the modular assembly and simple assembly of multiple plates, there is a high degree of flexibility in the dimensioning and design of the unit. Furthermore, both the dimensioning and design of the unit may be user-friendly and easily carried out by the user.

Advantageously, the dimensioning and design of the outer frame as well as the number of shelf modules, and colour and dimensioning of the shelf modules are computer implemented, such as being carried out in a web based programme, which further may include a process for ordering the plates needed for the chosen design.

The outer frame must be solidly established, and thus the vertical outer frame plates must be solidly connected to the horisontal outer frame plates. A solid outer frame based on vertical and horisontal frame plates may be assembled by different fastening means. Examples of fastening means include dowels, and/or wedges. Additional fastening means to further stabilise the outer frame plates to each other may be applied.

In an embodiment of the invention, the outer frame is configured to be assembled by fastening means, such as dowels and/or wedges. In a further embodiment of the invention, the outer frame is configured to be assembled by installation of two or more wedges according to the present invention.

Shelf Modules

Each shelf module comprises two vertical side plates and two horisontal shelf plates, where one or both of the shelf plates are shared with the module above and/or below, as illustrated in FIG. 1. The simple assembly of a shelf module within the outer frame is obtained by attaching, or fixing, the side plates and horisontal plates of the module to the outer frame by use of a wedge according to the present invention.

The assembly and fixing of shelf modules within an outer frame is illustrated in the embodiment shown in FIG. 2. The assembly is carried out from the bottom of the outer frame. FIGS. 2A, B, D show a first horisontal shelf plate, which may be superimposed and abutting the bottom horisontal frame plate, and FIGS. 2A-B further show a side plate in position before assembly, and FIG. 2C shows an assembled side plate.

Figure 2A:
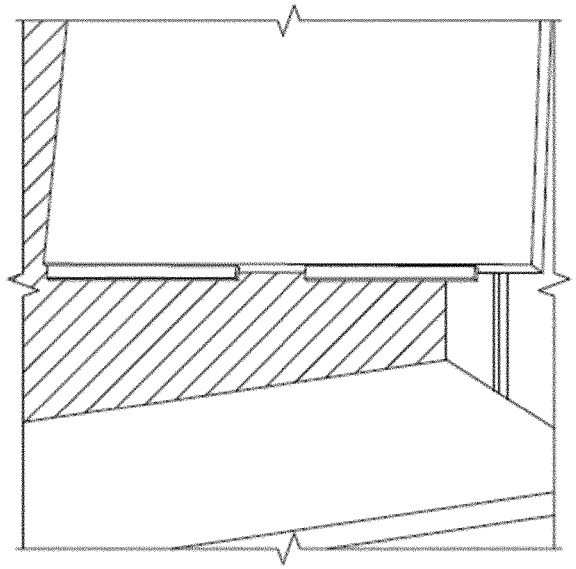
FIGS. 2A, B, D show a first horisontal shelf plate, which may be superimposed and abutting the bottom horisontal frame plate.
Figure 2B:
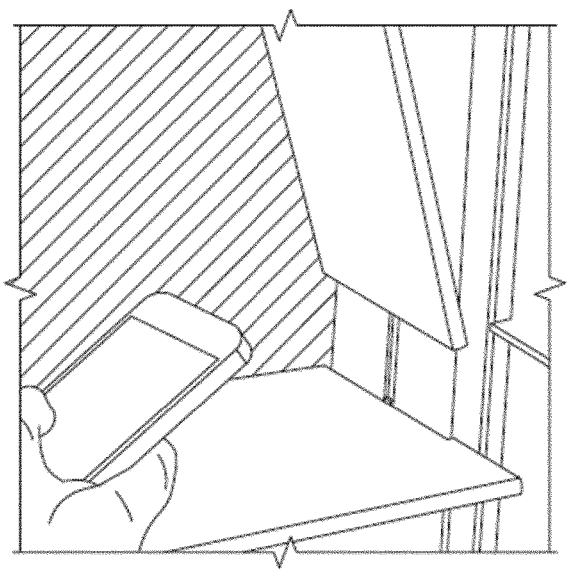
Figure 2C:
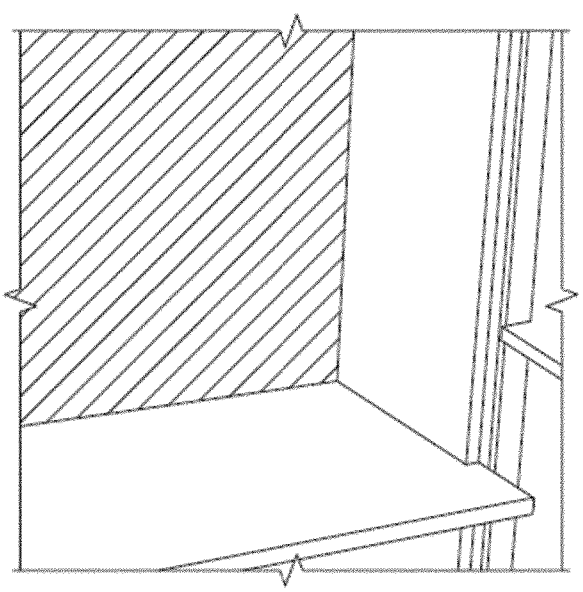
FIG. 2C shows the assembled side plate.
Figure 2D:
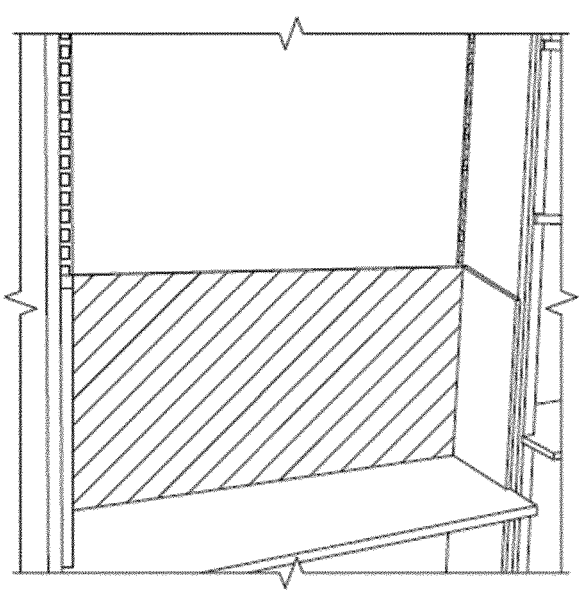

FIGS. 2B-C only shows the assembly a side plate at one end of the shelf plate, however the same will apply to the other end of the shelf plate. Thus, two vertical side plates are placed against opposite vertical inner surfaces of the outer frame, such that the two side plates are placed opposite each other.

Figure 3A:
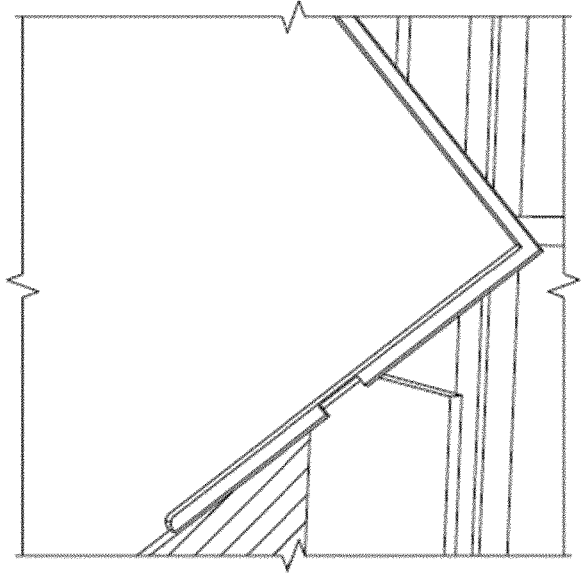
FIG. 3A shows an embodiment of the shelf plate.

The first edge of the side plate, which is to be connected to the first shelf plate, is shown in FIGS. 2A-B to comprise a groove along an edge configured to form a first notch-and-groove engagement with the first shelf plate. Another embodiment of the groove is shown in FIG. 3A.

Figure 3B:
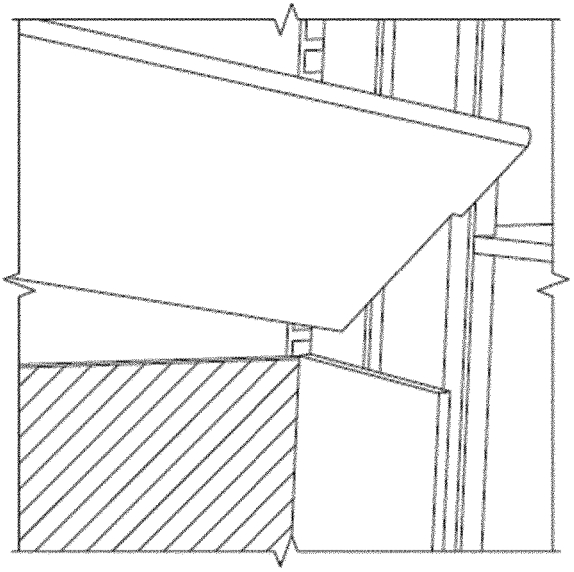
FIGS. 3B-D show how a first edge of the side plate engages with a first shelf plate (the bottom shelf plate in FIG. 3D) in a first notch-and-groove engagement, and the second edge of the side plate, placed oppositely to the first edge, engages with a second shelf plate (the top shelf plate in FIG. 3D) in a similar first notch-and-groove engagement.
Figure 3C:
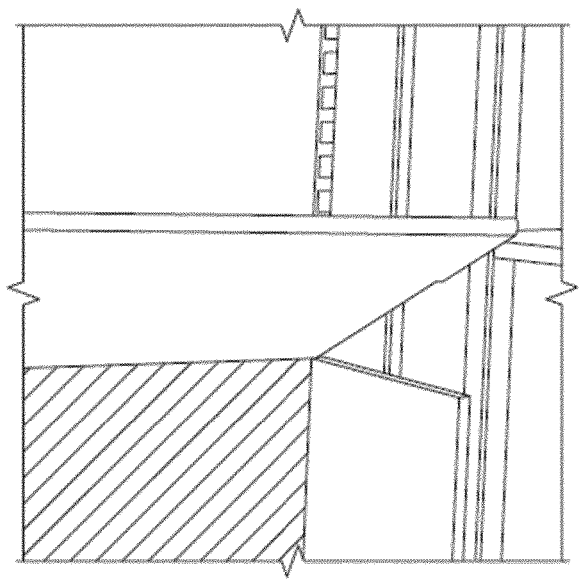
Figure 3D:
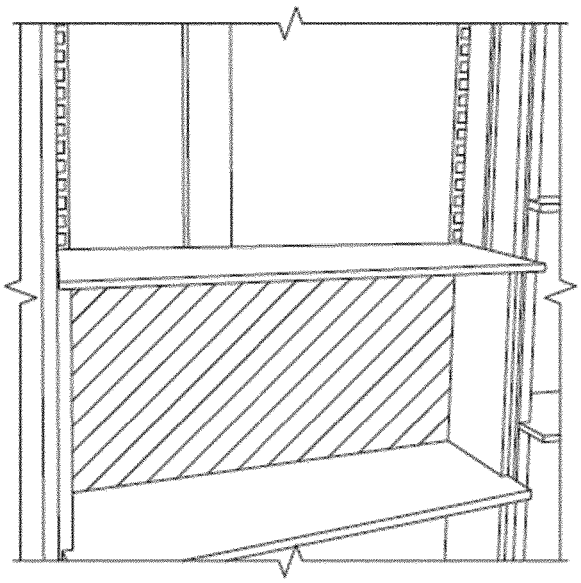

The second edge of the side plate placed opposite the first edge, may comprise a similar groove along the edge, and being configured to form a similar first notch-and-groove engagement with a second shelf plate to be placed on top of the side plate, as shown in FIGS. 3B-D.

As shown in FIG. 3D, each module comprises two vertical side plates placed opposite each other, and placed against opposite vertical inner surfaces of the outer frame.

Thus, multiple shelf modules may be assembled within the outer frame by alternating placing a horisontal shelf plate, followed by placing two vertical side plates, followed by placing a horisontal shelf plate, and so forth until the side plates and/or a horisontal shelf plate is abutting the upper horisontal frame plate.

Optionally one or more of the shelf modules within an outer frame comprises a vertical back plate placed at the shelf depth within a module. A shelf module comprising a back plate is indicated in FIG. 4C. The back plate may be placed before the two vertical side plates as illustrated in FIGS. 4A-B, and the back plate is supported to be vertically oriented by one or more edges extending orthogonally from any of the outer frame plates. FIGS. 4A-B show an embodiment, where the vertical outer frame plates comprise an orthogonal extending edge made of metal, against which the back plate is placed and supported to be vertical.

In an embodiment of the invention, the one or more shelf modules comprises a back plate. In a further embodiment, the one or more of the outer frame plates further comprise an orthogonal extending edge fastened to the frame plate by fastening means, wherein the orthogonal edge optionally is made of a metal. In a further embodiment, each frame plate comprises an orthogonal edge fastened essentially at the middle of the frame plate. In a further embodiment, the orthogonal edges are configured to support the back plate.

Each shelf module comprising two side plates and a horisontal shelf plate is fixed to the outer frame by use of two wedges according to the present invention, where a wedge is placed at each end of the shelf plate. FIGS. 6, 8-13 show embodiments of the installation of a wedge at one end of the shelf plate, i.e. the right end of the shelf plate. The same procedure will apply to the left end of the shelf plate, and is not shown.

Figure 8:
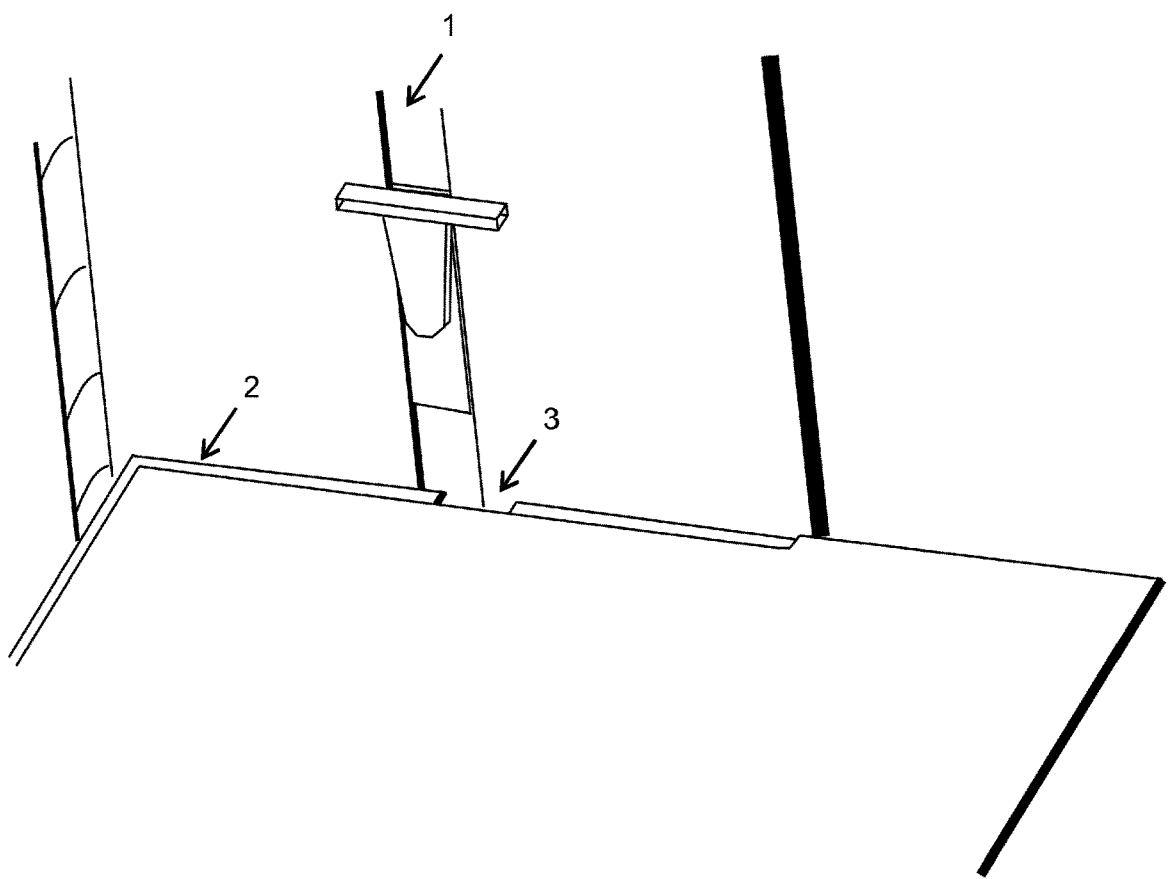
FIG. 8: shows an embodiment of fixing a shelf plate to a vertical outer frame plate by insertion of a wedge according to the present invention. The position of the wedge immediately before installation is shown, where the wedge is slidably placed in a vertical groove of the frame plate. The wedge is to be slidably received within the aperture formed between the shelf plate, and the vertical groove of the frame plate, as illustrated in FIG. 9. The reference numbers indicate the inner surface of the vertical outer frame comprising a first vertical groove 1, the horisontal shelf plate comprising a first groove 2 extending along the edge of the shelf plate, and configured to engage with a side plate in a first notch-and-groove engagement, and the second notch of the shelf plate 3 placed at the end of the shelf plate.

An embodiment of the vertical outer frame plate and the horisontal shelf plate to be attached or fixed by the wedge is shown in FIG. 8 before the wedge is installed. FIG. 8 shows that the inner surface of the vertical outer frame comprises a first vertical groove 1. The horisontal shelf plate comprise a first groove 2 extending along the edge of the shelf plate configured to engage with a side plate in a first notch-and-groove engagement. The shelf plate further comprises a second notch 3 at the end of the shelf plate.

In FIG. 8, the wedge is configured to be received within the aperture formed at the end of the shelf plate between the first vertical groove of the frame plate, and the second notch at the end of the shelf plate. The wedge is further configured to be installed by sliding a first surface of the wedge within the first vertical groove, and towards the shelf plate, whereby a second surface of the wedge engages with the shelf plate.

To ensure a simple and uniform installation of the wedge, the wedge is preferably installed by the wedge being slidably placed in a vertical groove of the frame plate as shown in FIG. 8, and the wedge is then slidably received within the aperture formed between the shelf plate, and the vertical groove of the frame plate.

Upon engagement with the shelf plate, the wedge is configured such that the horisontal shelf plate is displaced in the horisontal direction transverse to the length of the shelf plate, or transverse to the width of the shelving unit. The length of the shelf plate will be parallel with the width of the shelving unit as e.g. seen in FIG. 1. Thus, the horisontal shelf plate is displaced towards the back plate or the orthogonal support, and in the direction away from the front of the shelving unit, or the front edge of the outer frame as illustrated in FIGS. 8-9.

Figure 7:
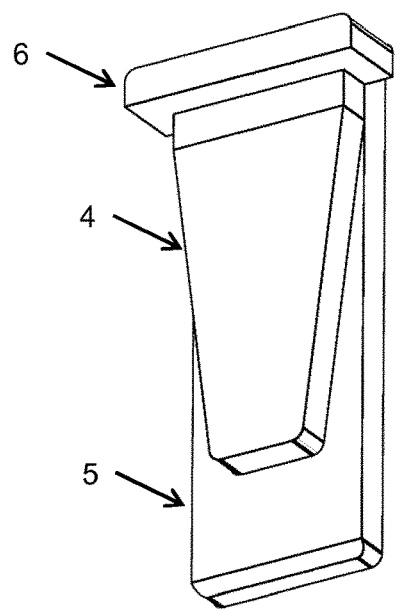
FIG. 7: shows a second embodiment of the wedge according to the invention. The wedge is indicated to comprise a rectangular plate 5, a trapezoid plate 4, and a beam 6.

The displacement of the horisontal shelf plate is obtained due to the shape of the wedge. An embodiment of the wedge according to the present invention is shown in FIG. 7. The wedge is seen to comprise a trapezoid plate 4, wherein the non-parallel edges are tapered towards the part of the wedge that is initially engaged with the shelf plate.

The wedge is defined to have a length and a width, where the length of the wedge is the direction parallel with direction of slidably inserting the wedge. The wedge will further have a first width edge, and a second width edge, at each end of the wedge length, where the second width edge is the end of the wedge that is initially slidably received within an aperture.

Figure 9:
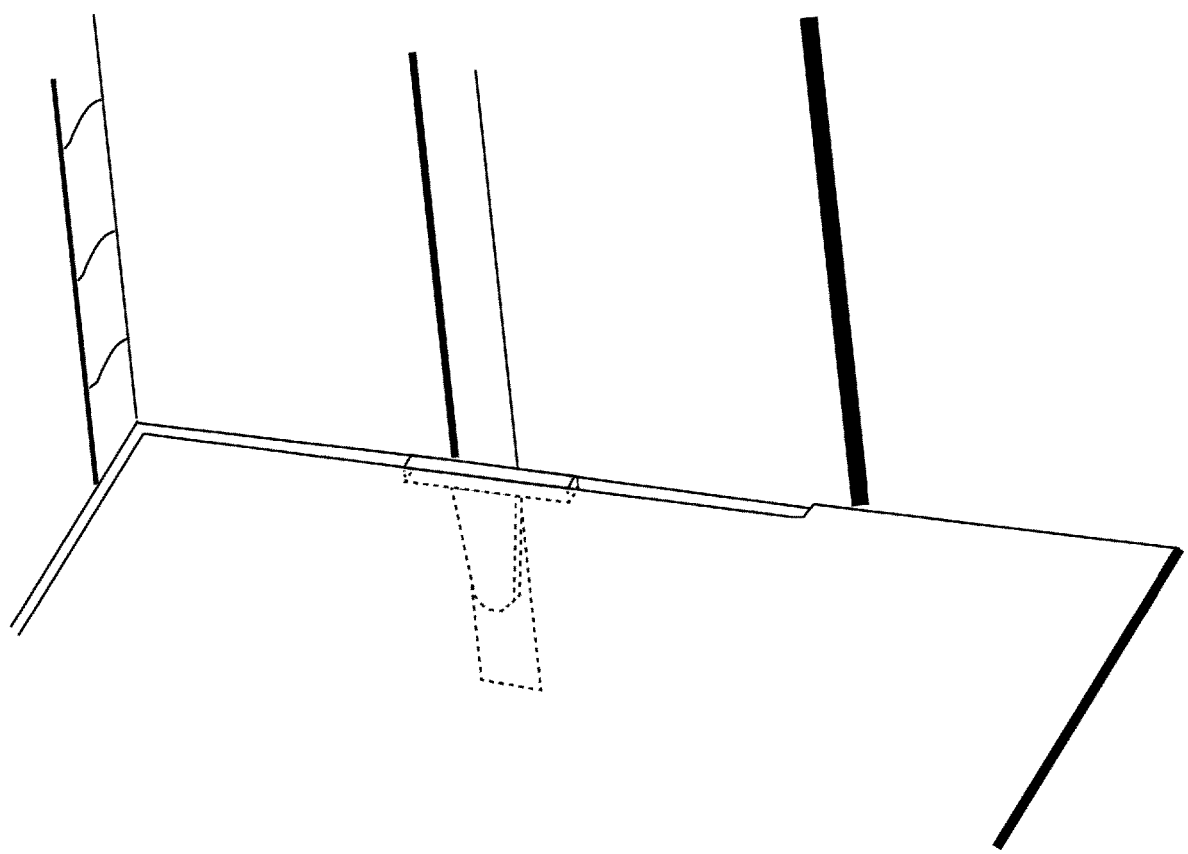
FIG. 9: shows the embodiment of FIG. 8 after the wedge is completely slidably received within the aperture formed between the shelf plate, and the vertical groove of the frame plate. The complete insertion of the wedge is defined by the beam of the T-shaped wedge. The insertion of the wedge displaces the shelf plate in the horisontal direction, such that the second notch of at the end of the shelf plate is directly opposing the first vertical groove of the frame plate, as indicated by the dotted lines in FIG. 9. This generates a compressive force between the back plate and/or the orthogonal supports and the shelf plate.

Due to the direction of the tapered edges, the shelf is displaced towards the back plate, and away from the front of the shelving unit, as the wedge is slidably engaged and fully inserted as shown in FIG. 9. At the point where the wedge is fully inserted, the shelf is displaced such that the first vertical groove of the outer frame plate is directly opposing the second notch of the shelf plate as shown with dotted lines in FIG. 9.

The displacement of the shelf plate generates a compressive and frictional force between the shelf plate and the back plate, and/or the orthogonal support as illustrated in FIGS. 8-9. This results in the stabilisation of the shelf module, since the shelf plate is thereby compressed against the outer frame.

Figure 11:
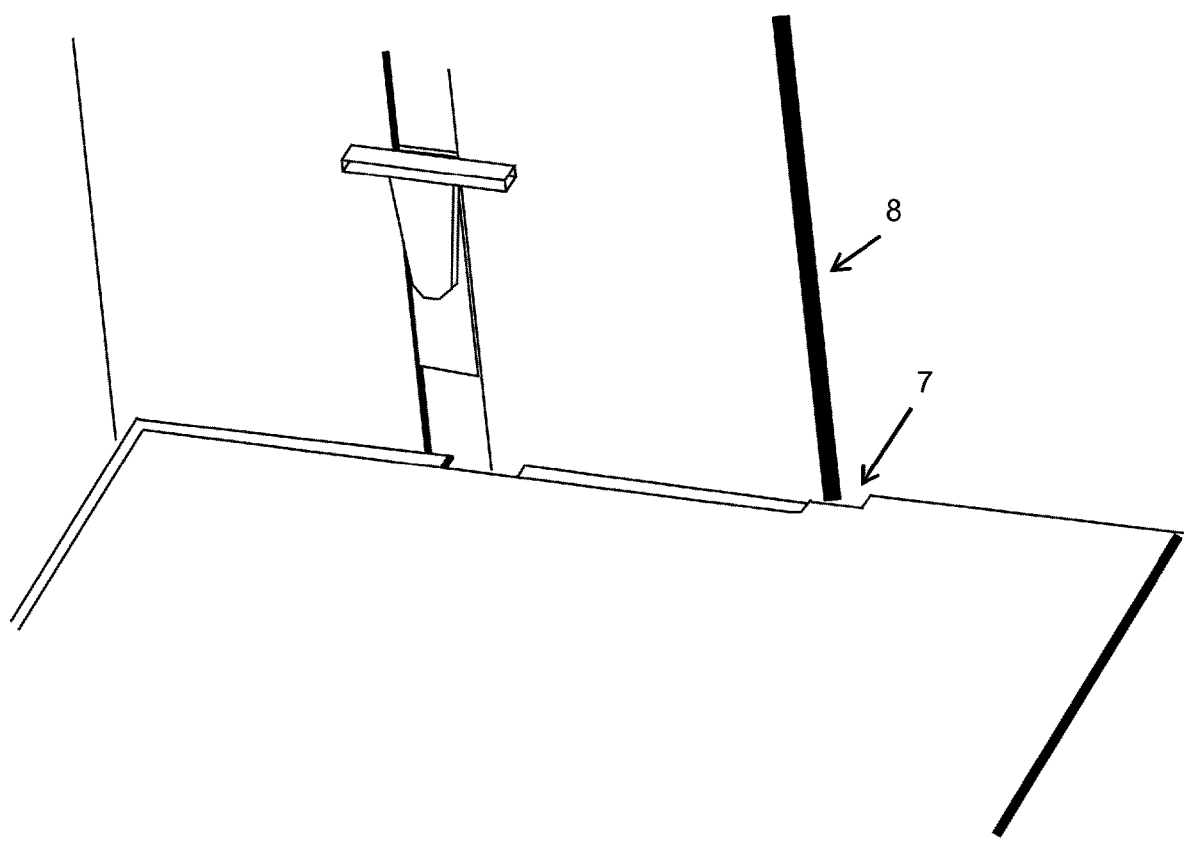
FIG. 11: shows an embodiment of the fixing of a shelf plate to a vertical outer frame plate by insertion of a wedge according to the present invention. The position of the wedge immediately before installation is shown, and where the wedge is slidably placed in a vertical groove of the frame plate. The wedge is to be slidably received within the aperture formed between the shelf plate, and the vertical groove of the frame plate, as illustrated in FIG. 12. The reference numbers indicate a third notch 7 at the end of the shelf plate, and a front edge of the outer frame 8.
Figure 12:
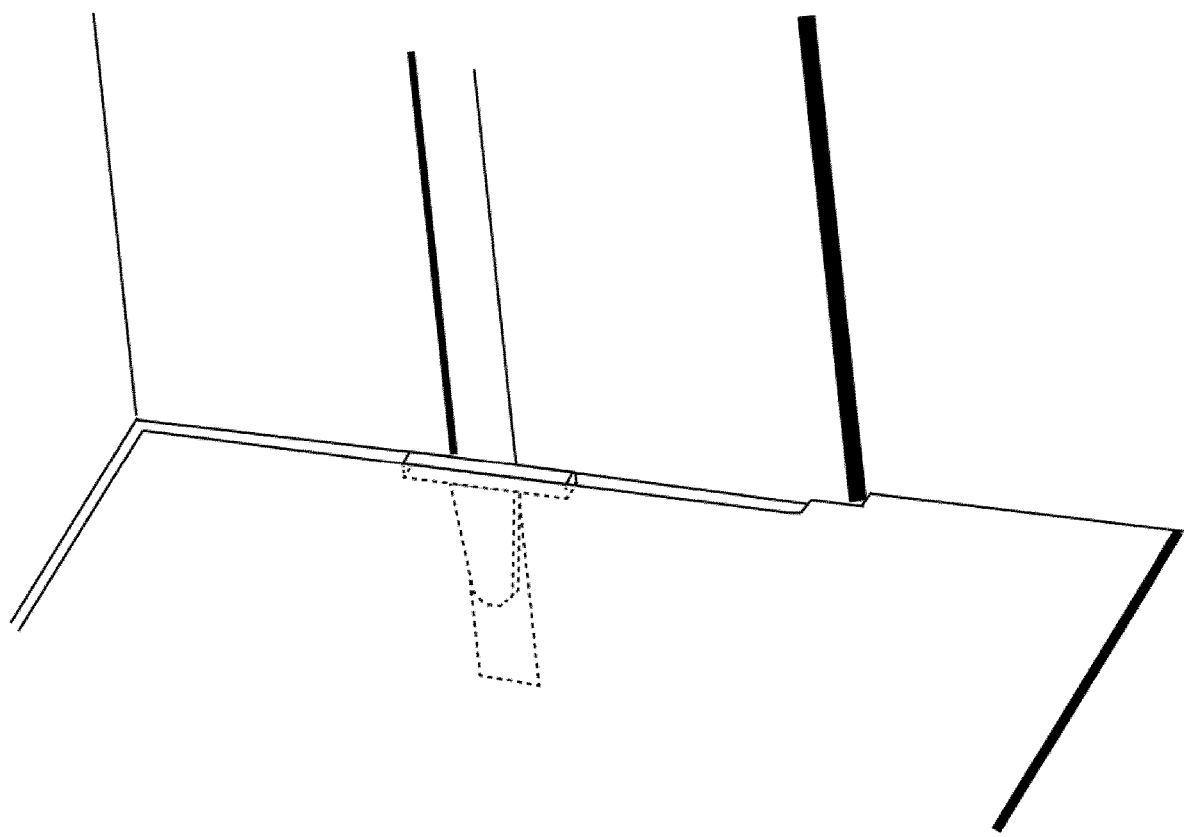
FIG. 12: shows the embodiment of FIG. 11 after the wedge is completely slidably received within the aperture formed between the shelf plate, and the vertical groove of the frame plate. The complete insertion of the wedge is defined by the beam of the T-shaped wedge. The insertion of the wedge displaces the shelf plate in the horisontal direction, such that the second notch of at the end of the shelf plate is directly opposing the first vertical groove of the frame plate, as indicated by the dotted lines in FIG. 12. This generates a compressive force between the shelf plate and the front edge of the outer frame. This compressive force may be an alternative or addition to the compressive force between the back plate and/or the orthogonal supports and the shelf plate as shown in FIG. 9.

In addition, or alternatively, a second compression against the outer frame may be obtained between a third notch of the shelf plate 7 and a front edge of the outer frame 8 as illustrated in FIGS. 11-12. FIGS. 11-12 show the assembly at the corresponding stages to FIG. 8-9, where FIG. 11 shows the wedge slidably positioned immediately before installation, and FIG. 12 shows the fully inserted wedge.

In an embodiment of the invention, the shelf plate comprises a third notch configured to engage with a front edge of the outer frame.

In an embodiment of the invention, shelf plate compression against the outer frame occurs towards a back plate and/or a front edge of the outer frame. In a further embodiment, the shelf plate is configured such that compression between the shelf plate and the outer frame occurs towards a back plate, and/or othogonal supports, and/or a front edge of the outer frame.

Figure 10:
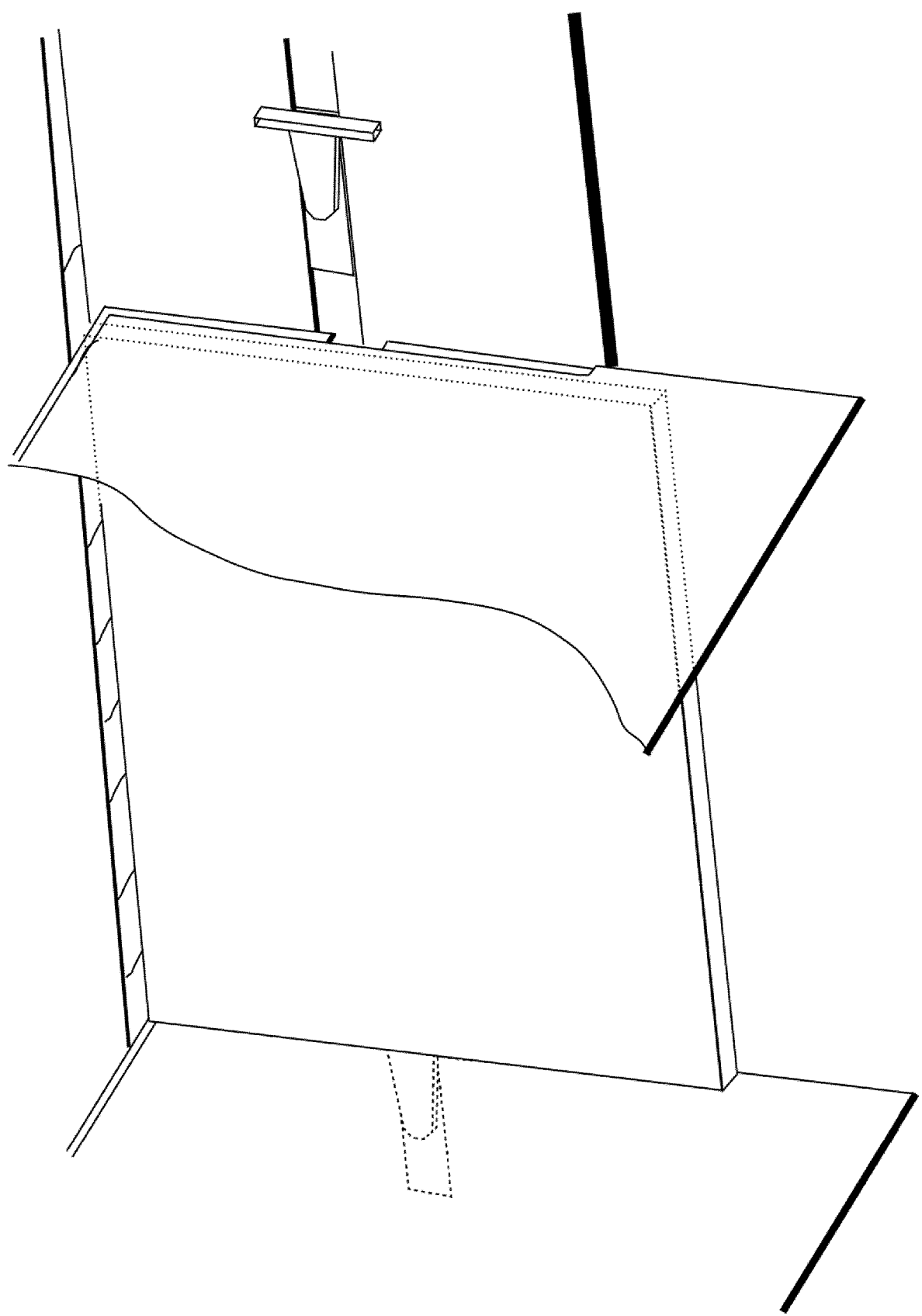
FIG. 10: shows an embodiment of fixing multiple shelf plates on top of each other using a wedge according to the present invention. A first shelf plate is fixed at the bottom, a vertical side plate is placed on top of the first shelf plate, and a second shelf plate is placed on top of the side plate.
Figure 13:
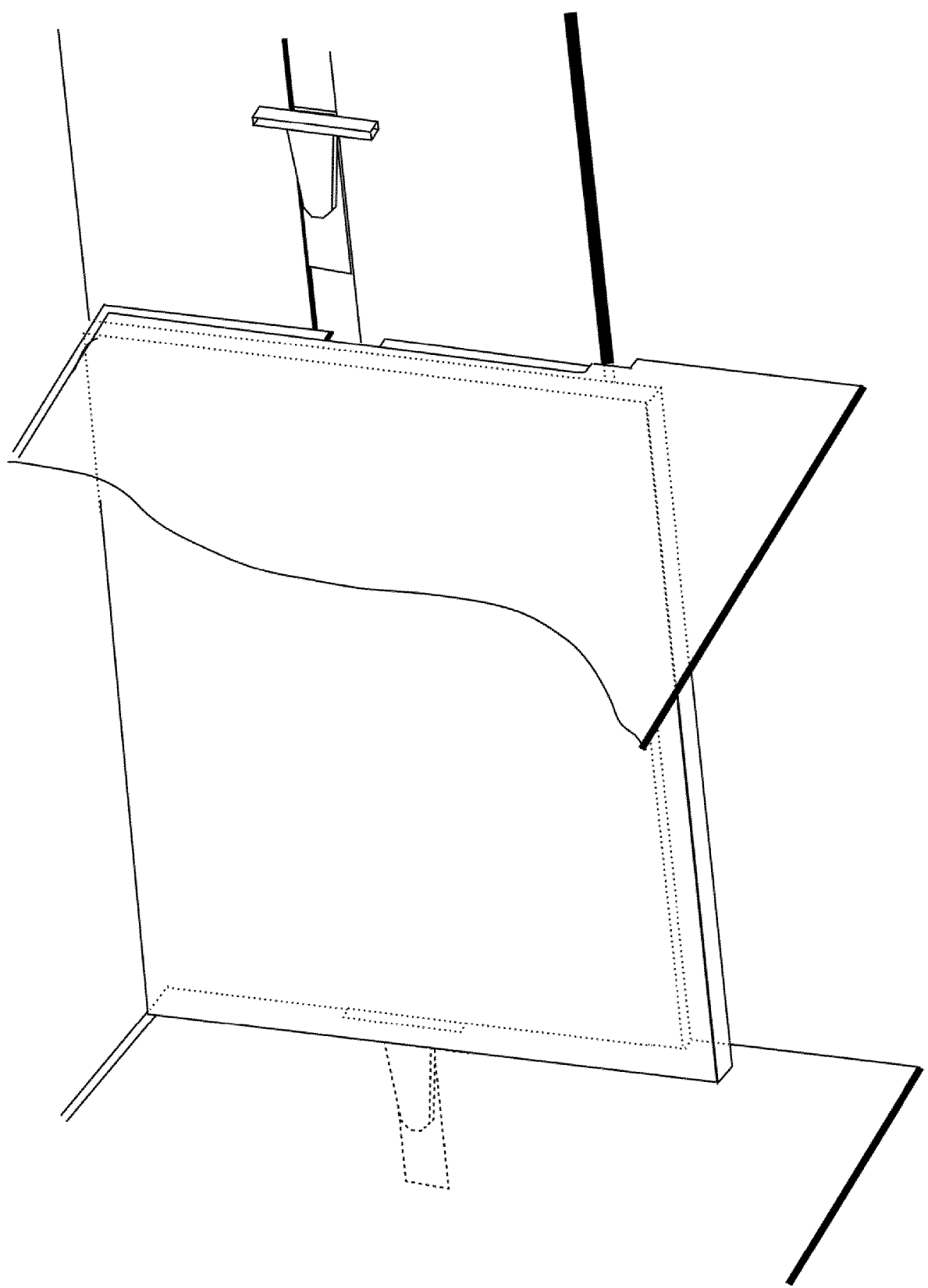
FIG. 13: shows an embodiment of fixing multiple shelf plates on top of each other using a wedge according to the present invention. A first shelf plate is fixed at the bottom, a vertical side plate is placed on top of the first shelf plate, and a second shelf plate is placed on top of the side plate.

A multiple of horisontal shelf plates placed on top of successive layers of vertical side plates may be assembled by the wedge as illustrated in FIGS. 10 and 13.

As described the modular furniture unit according to the invention may be assembled without the use of tools, and preferably only by the use of the wedge according to the invention. Thus, the assembly is simple, and a stable construction is easily obtained with a minimum of risk of erroneously assembly causing risk collapsing.

The stability of the connection between the vertical outer frame plate and the shelf plate is determined by the stability of the engaged wedge. The wedges fixes the two plates by frictional engagement. The frictional force will depend on the shape of the contact area, and the size of contact surface area. Thus, it is advantageous that the contact area between the wedge and the first vertical groove of the frame plate is as large as possible.

In an embodiment of the invention, the first vertical groove of the frame plate have the shape of a rectangular groove.

The slidable insertion of the wedge in combination with the horisontal displacement of the shelf plate is facilitated by the shape of the wedge in combination with the shape and position of the second notch at each end of the shelf plate. The shape of the second notch and the tapered edges of the wedge which taper towards the end of the wedge that is initially slidably received within the aperture, facilitate that the wedge is easily engaged without the use of excessive force, or additional tools. Further, the tapered edges facilitate a controlled horisontal displacement of the shelf plate, such that the compressive force on the outer frame is controlled.

In an embodiment of the invention, the second notch at each end of the shelf plate has the shape of a rectangular notch.

In a further embodiment, the shelf plate is configured such that the second notch at each end of the shelf plate respectively opposes the oppositely placed first vertical grooves of the frame, when the horisontal shelf plate is placed on top of the vertical side plates.

In a further embodiment, the shelf plate is configured such that the second notch at each end of the shelf plate is opposing the first vertical groove of the frame with a displacement, when the horisontal shelf plate is placed on top of the vertical side plates, and the wedges are not installed.

In a further embodiment, the displacement is between 1 mm to 20 mm, more preferably between 1 mm to 10 mm, and most preferably between 1 mm to 4 mm.

In a further embodiment, the shelf plate is configured such that the second notch at each end of the shelf plate is opposing the first vertical groove of the frame without a displacement, when the horisontal shelf plate is placed on top of the vertical side plates, and the wedges are installed.

To improve the stability of the furniture unit, the side plates and shelf plates placed on top or below said side plates, are advantageously engaged in a first notch-and-groove engagement.

In an embodiment of the invention, the edges of the side plates comprise a groove configured to form the first notch-and-groove engagement with the shelf plate.

Thus, the shelf plate comprises a corresponding groove, or inverted groove, to mate with the side plate in the first notch-and-groove engagement. The corresponding groove of the shelf plate is the first groove 2 of the shelf plate shown in FIG. 8.

The first groove of the shelf plate may extend fully or partially along the edges of the shelf plate. In FIG. 8, the first groove of the shelf plate extend fully along the shelf edge placed in the shelf depth, and partially along the shelf edge ends, or the edges placed adjacent to the side plate.

Advantageously, a first groove of the shelf plate is present on both surface planes of the shelf plate, such that a notch-and-groove engagement is obtained with vertical side plates placed both above and below the horisontal shelf plate. In an embodiment of the invention, one or both surface(s) of the shelf plate comprises a first groove extending fully or partially along one or more edges of the shelf plate.

The first groove of the shelf plate extending fully along the shelf edge placed in the shelf depth facilitate that the back plate may be further stabilised in a second notch-and-groove engagement. In an embodiment of the invention, the first groove extend fully along a longitudinal edge of the shelf plate, wherein the longitudinal first groove is configured to engage with the back plate in a second notch-and-groove engagement.

Advantageously, the first groove of the shelf plate extend partially along the shelf edge ends, as shown in FIG. 8. The partially extending groove will have an end point at the edge, which may be referred to as a third notch 7 as shown in FIG. 11. This facilitates that a compression against the outer frame may be obtained between the third notch of the shelf plate and a front edge of the outer frame 8 as shown in FIGS. 11-12. Thus, a partially extending groove along the shelf plate end will result in a further stabilised assembly construction. The partially extending groove further facilitate a notch-and-groove engagement with the vertical side plate.

In an embodiment of the invention, the first groove extend partially along the ends of the shelf plate, wherein said partial groove is configured to engage with the vertical side plate in the first notch-and-groove engagement.

In a further embodiment, the partial groove is configured to engage with the outer frame at the end point of the groove. In a further embodiment, the end point of the groove corresponds to the third notch of the shelf plate.

In a further embodiment, the partial groove extend along between 50 to 99% of the shelf end, more preferably between 60 to 90%, or 70 to 80%.

To further stabilise the assembly, the side plates may be further configured to engage with the wedge. The surface of the side plate to be placed against the inner surface of the vertical frame plate, may comprise a second vertical groove. The second vertical groove may be similar in shape to the first vertical groove of the frame plate, and eg. have the shape of a rectangular groove, and when placed against the vertical inner surface of the outer frame, the first vertical groove and the second vertical groove is opposed. The second vertical groove may be partially extending along the side plate, such that the end of the groove abuts an end of an installed wedge.

In an embodiment of the invention, at least a part of the surface of the side plate comprises a second vertical groove. In a further embodiment, the second vertical groove have the shape of a rectangular groove. In a further embodiment, the side plate is configured such that the second vertical groove opposes the first vertical groove of the frame plate, when side plate is placed against the vertical inner surface of the outer frame. In a further embodiment, the extension of the second vertical groove is configured such that an edge of the groove abuts an end of an installed wedge.

Wedge

The wedge according to the invention provides a more simple and flexible assembly and/or disassembly and/or reassembly of any parts. The parts may be parts of a shelving unit or a shelf module as described above. However, the wedge may also be used for assembling or connecting other parts, such as parts for a furniture or any construction. The wedge further provides a stable and robust assembled construction, where the risk of accidental collapse of the structure is reduced.

Figure 5A:
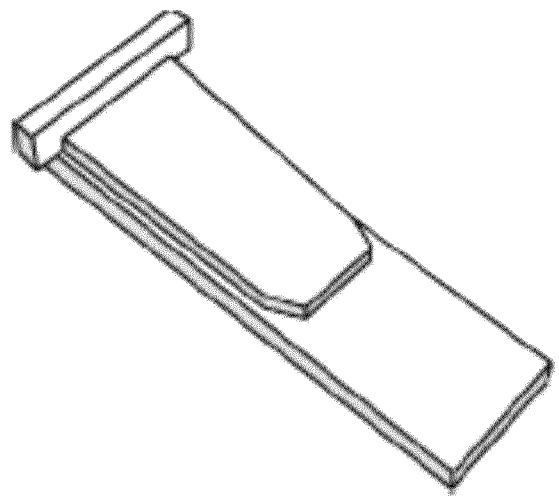
FIG. 5: shows a first embodiment of the wedge according to the invention, where (A) shows a schematic drawing in perspective view, and (B) shows a photo of an embodiment of the wedge.
Figure 5B:
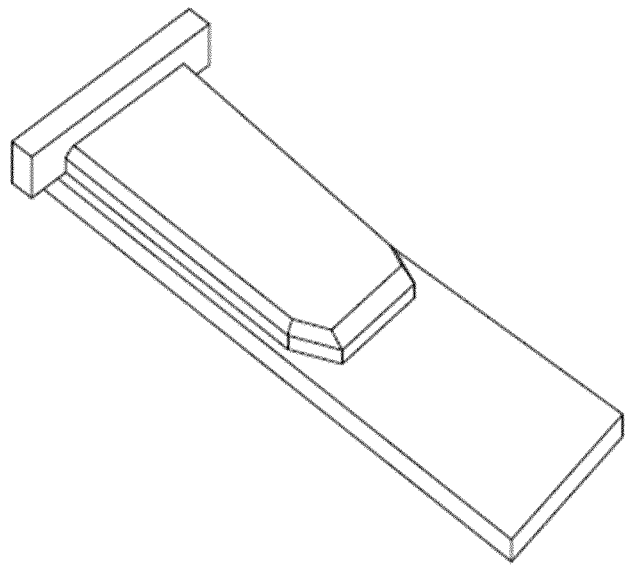
Figure 6A:
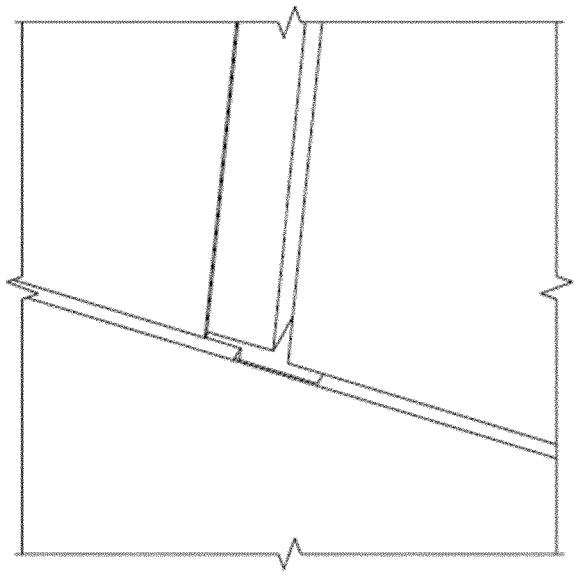
FIG. 6: shows an embodiment of assembling and fixing a shelf plate to a vertical outer frame plate using a wedge according to the invention. (A) shows the aperture wherein the wedge is placed, (B) and (C) show a wedge during assembly, and (D) shows the wedge in assembled position. During installation of the wedge, the shelf plate is displaced in the horisontal direction transverse to the width of the shelving unit and towards the orthogonal supports, as indicated by the arrows in FIG. 6C.
Figure 6B:
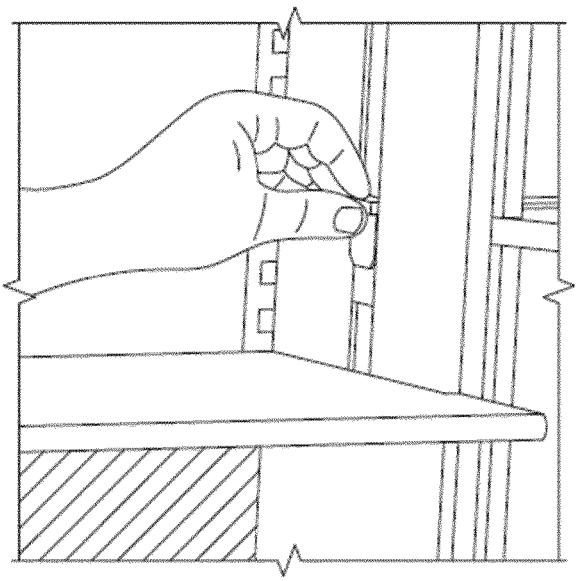
Figure 6C:
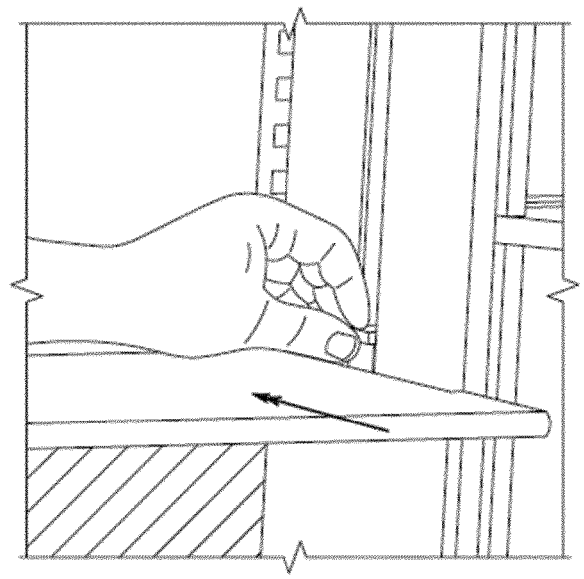
Figure 6D:
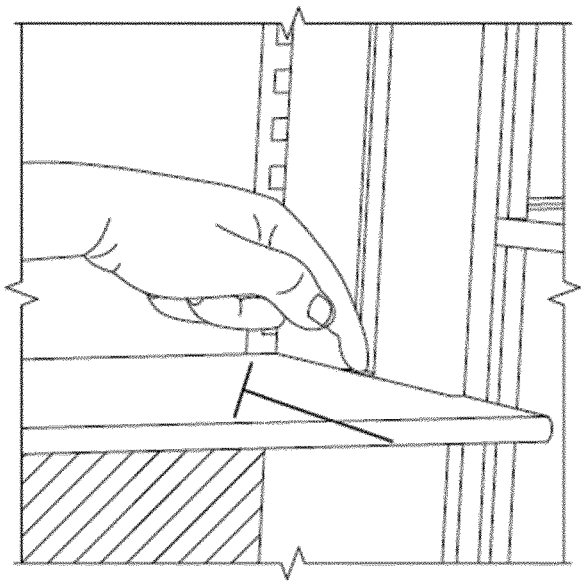
Figure 14:
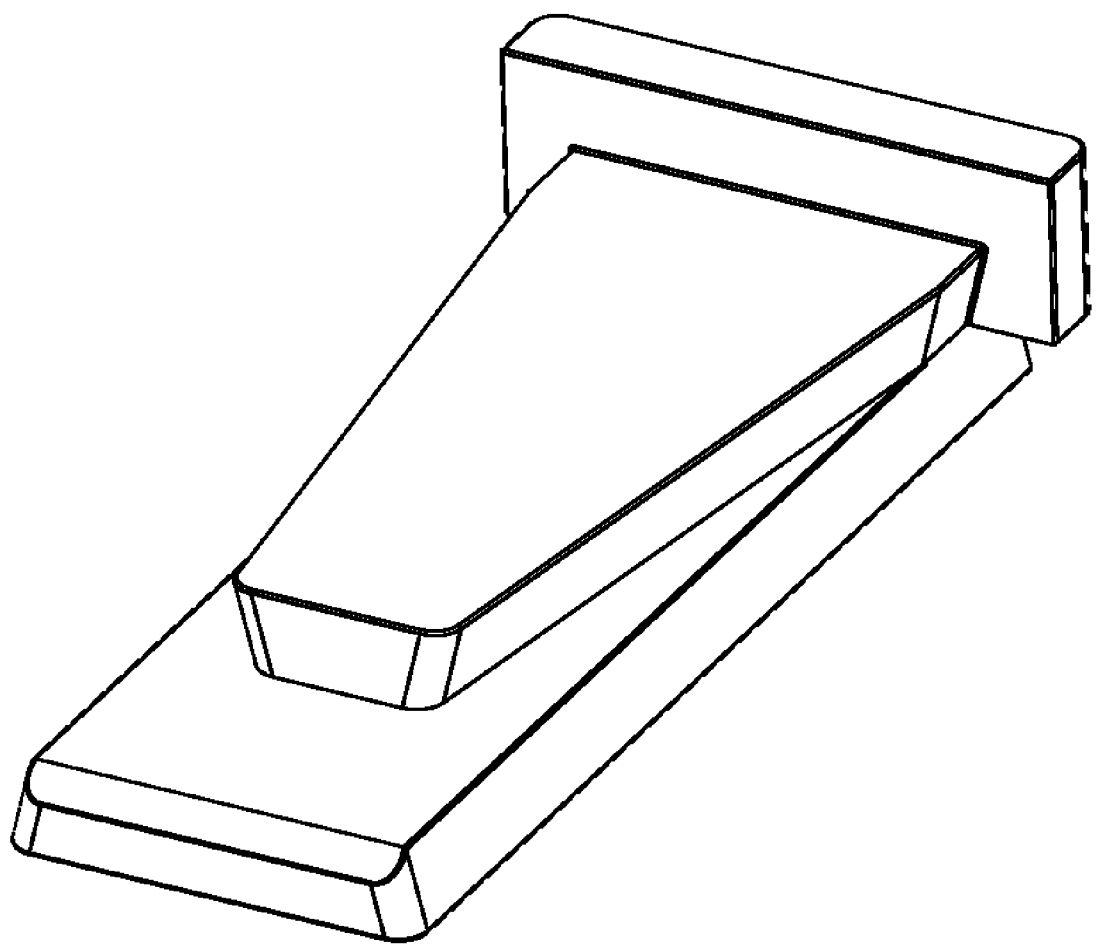
FIG. 14: shows a third embodiment of the wedge according to the invention.
Figure 15:
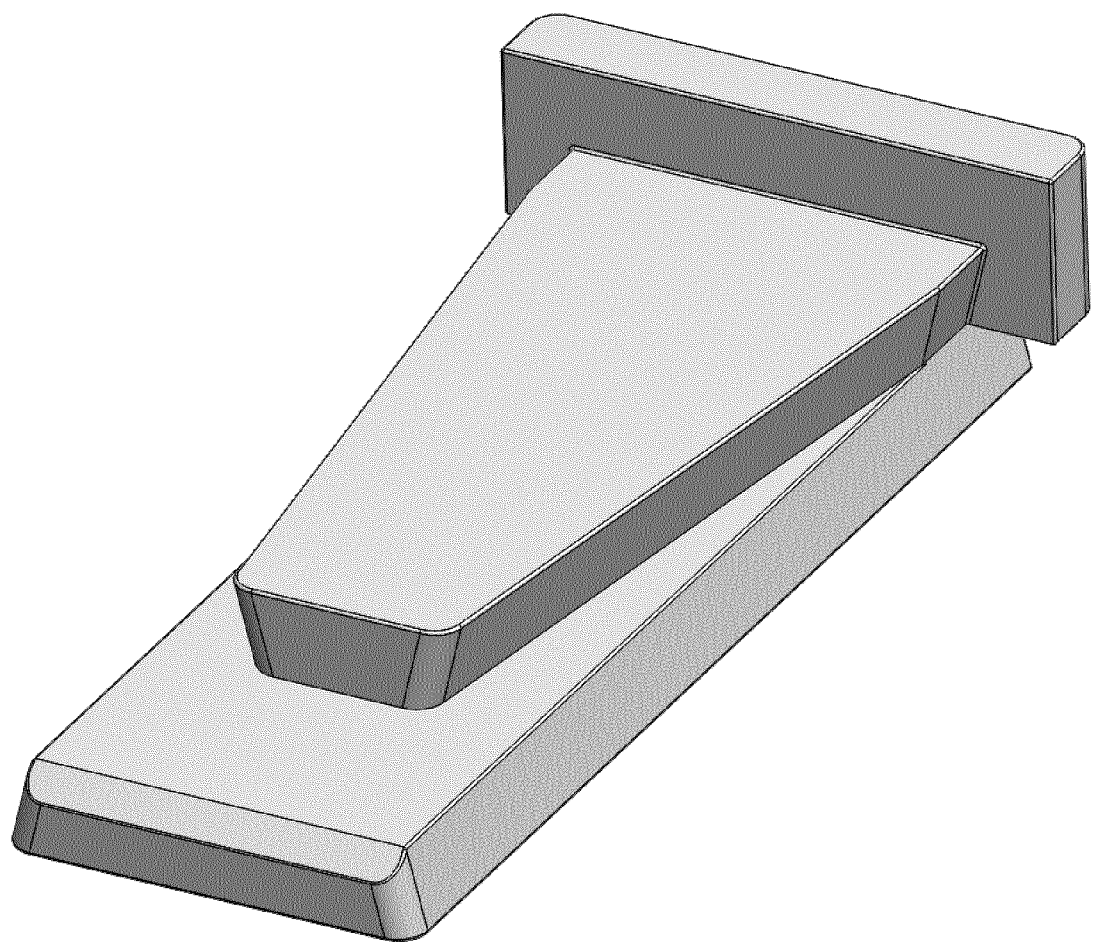
FIG. 15: shows the third embodiment of the wedge according to the invention in a perspective view.
Figure 16:
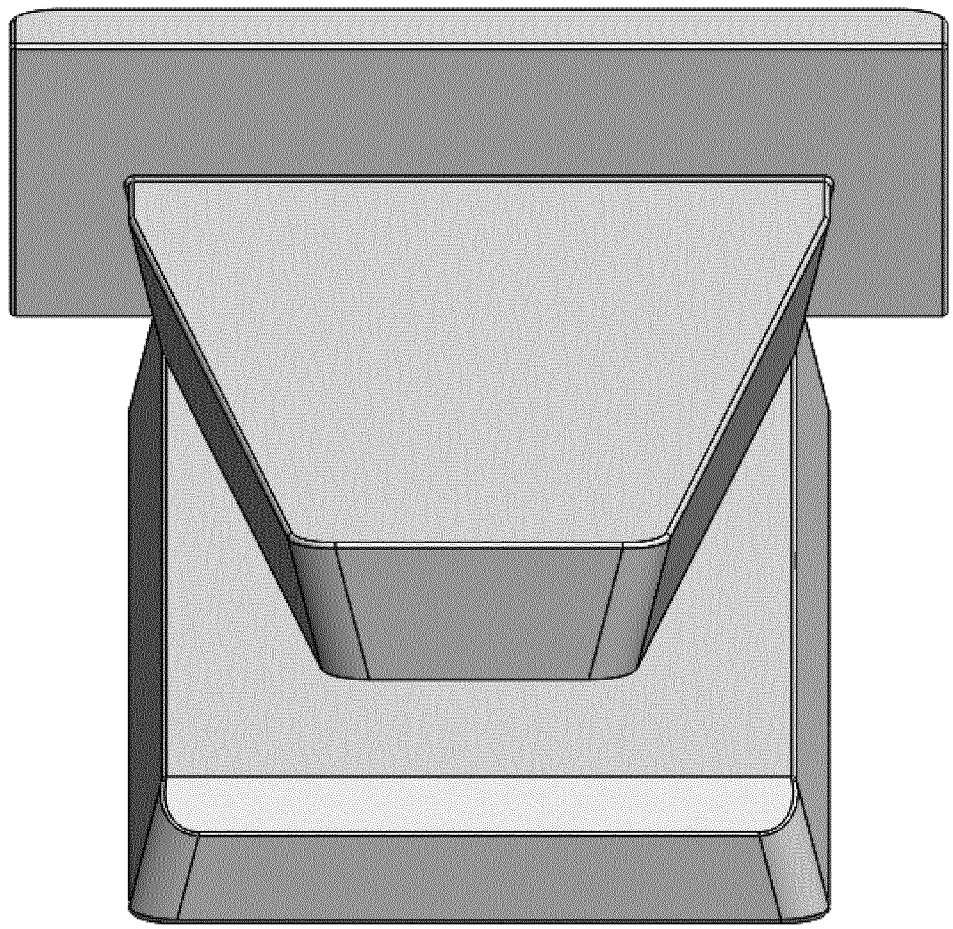
FIG. 16: shows the third embodiment of the wedge according to the invention in a perspective view seen from the end of the wedge that is initially slidably received within an aperture.

FIG. 5 shows a first embodiment, FIG. 7 a second embodiment, and FIGS. 14-16 a third embodiment of the wedge according to the present invention. The wedges comprises a rectangular plate 5, a trapezoid plate 4, and a beam 6.

By the term "rectangular plate" is meant a planar part having a thickness, thereby defining planar edges, and having a rectangular plane, i.e. a plane with four right angles. Thus, the term rectangular plate includes a plate with four edges of equal length, i.e. a square.

By the term "trapezoid plate" is meant a planar part having a thickness, thereby defining planar edges, and having a plane defined by a pair of parallel sides, and a pair of non-parallel sides, also referred to as the lateral sides or the legs of the trapezoid.

For simple, error-free, and easy insertion of the wedge, the wedge is configured to be slidable inserted, such that the wedge is easily inserted without the use of excessive force, or additional tools. The wedge is further configured such that the complete insertion of the wedge is well-defined and controlled.

Thus, the wedge has a first end, which is the end that is initially slidably received within the aperture, and a second end defining the complete insertion of the wedge.

Thus, the wedge is defined to have a length and a width, where the length of the wedge is the direction parallel with direction of slidably inserting the wedge, and the wedge will further have a first width edge, and a second width edge, at respectively each end of the wedge length, where the first width edge is the end of the wedge that is initially slidably received within an aperture.

The wedge is configured to be slidably received with an aperture by having a trapezoid plate, wherein the non-parallel edges of the trapezoid taper towards the end of the wedge that is initially slidably received within the aperture. The tapered edges of the trapezoid plate may have different lengths, as illustrated in FIG. 5 where the tapered edges are shorter than in FIGS. 7, and 14-16.

To further enable a slidable and controlled insertion of the wedge, the wedge comprises a rectangular plate which may act as a guide while inserting the wedge as shown in FIG. 8. Advantageously the rectangular plate is longer in the direction of insertion than the trapezoid plate, to facilitate the slidable and controlled insertion of the wedge.

In an embodiment of the invention, the length of the rectangular plate is longer than the trapezoid plate.

In a further embodiment, the trapezoid plate cover between 10 to 90% of the rectangular plate area, more preferably between 30% to 80% or 40% to 70%, and most preferably between 50% to 60%.

To improve the stability, and ensure safe and controlled assembly, it is advantageous that the complete insertion of the wedge is well-defined and controlled. Thus, the wedge comprises a beam placed at the second end of the wedge, which is the end of the wedge that is inserted as the last past. The beam thus defines a T-shape of the wedge, whereby the degree of insertion of the wedge is limited by the constriction of the beam.

In an embodiment of the invention, the wedge is configured to be slidably received within an aperture from the end opposite the beam.

The T-shape may be obtained by assembling the beam, trapezoid plate and rectangular plate as shown in FIG. 5, 7, or 14, where the beam is superimposed on the rectangular plate, such that the beam level with the first width edge of the rectangular plate. The first width edge of the rectangular plate is the end of the rectangular plate that is inserted as the last part.

In an embodiment of the invention, the beam is superimposed on the rectangular plate such that the beam level with the first width edge of the rectangular plate, and wherein the first parallel edge of the trapezoid plate abuts the beam.

A wedge is generally fixed by frictional engagement between two planes. The frictional force depends on the contact surface, and the contact surface area. The bigger the surface area, the higher the frictional force. It is therefore advantageous that the edges in the length direction, or wedge insertion direction, are larger. This may be obtained if the edges in the length direction of the rectangular plate and/or trapezoid plate form an angle to the plane of the plates. Further the lower the angle, the larger the surface area will be.

In an embodiment of the invention, the edges in the length direction of the rectangular plate and/or trapezoid plate form an angle to the plane of the plates.

In a further embodiment, the tapered edges of the trapezoid plate form a first angle to the plane of the plates, wherein said angle preferably is between 10 to 90 degrees, more preferably between 30 to 45 degrees, and most preferably is between 60 to 80 degrees, or essentially is perpendicular to the plane of the plates.

In another and further embodiment, the edges in the length direction of the rectangular plate form a second angle to the plane of the plates, wherein said angle preferably is between 10 to 90 degrees, more preferably between 30 to 45 degrees, and most preferably is between 60 to 80 degrees, or essentially is perpendicular to the plane of the plates.

Embodiments of the wedge, where the first and second angles are essentially perpendicular to the plane of the plates are shown in FIGS. 5 and 7.

To further improve the frictional engagement of the wedge, it may be advantageous that the first and second angles are reverse, as shown in the embodiments in FIGS. 14-16. Thus, the edge of the trapezoid plane and the edge of the rectangular plane, defines an acute angle.

In an embodiment of the invention, the first and the second angles are reverse or mirror imaged, such that the angle formed between the planes of the tapered edges and the rectangular length edges is acute.

The frictional engagement of the wedge will also depend on the shape of the tapered edges.

In an embodiment of the invention, the tapered edges are tapered in a manner selected from the group of: linear, exponential, logarithmic, and any combination thereof.

In a further embodiment, the tapered edges are linear and form a third angle to the length direction of the plates, wherein said angle is between 1 to 45 degrees, more preferably between 5 to 35 degrees, and most preferably between 5 to 25 degrees, or between 5 to 15 degrees.

The wedge according to the invention is advantageoulsy applied for assembling furniture, such as shelf modules and shelving units. The size of the wedge influences on how easily the wedges are applied and how much force is needed. Further for easy handling, the any of the dimensions of the wedge advantageously have a dimension below 20 cm.

In an embodiment of the invention, the length of the rectangular plate is between 1 mm to 1 m, more preferably between 1 cm to 50 cm, 2 cm to 10 cm, or 3 cm to 7 cm, and most preferably is ca. 5 cm.

In a further embodiment, the trapezoid plate has a length between 1 mm to 1 m, more preferably between 5 mm to 40 cm, 2 cm to 9 cm, or 2 cm to 5 cm, and most preferably is ca. 3 cm.

In a further embodiment, the thickness of the rectangular plate and/or the trapezoid plate is between 1 mm to 10 cm, more preferably between 1 mm to 50 mm, 1 mm to 30 mm, or 1 mm to 10 mm, and most preferably is ca. 3 mm.

The T-shaped wedge may be produced in any materials, and are advantageously made of cheap and accessible materials such as plastics, metals, wood, and combinations thereof. Examples of plastic materials include poly(methyl methacrylate) (PMMA), nylon, and polyurethane. Examples of metals include: aluminium (Al), and stainless steel.

In an embodiment of the invention, the wedge comprises a material selected from the group of: plastic materials, metals, wood, and any combination thereof.

The T-shaped wedge may further be produced by several methods, and may further be made by cheap and cost-efficient methods. For example a wedge made of a plastic material is advantageosly produced by injection moulding, or combined moulding and gluing, or 3D-printing.

In an embodiment of the invention, the wedge is made by moulding, such as injection moulding, 3D-printing, and/or gluing.

Wedge Comprising Slit

FIGS. 17-22 shows a further fourth embodiment of the wedge according to the present invention, where the wedge further comprises at least one slit configured for slidably receiving an expander.

Figure 17:
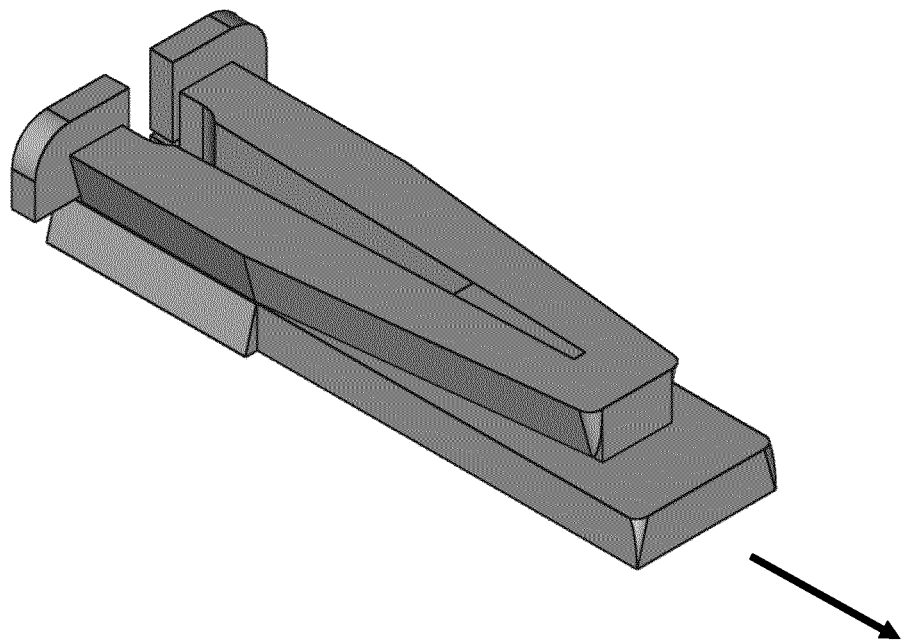
FIG. 17: shows a fourth embodiment of the wedge according to the invention in a perspective view.
Figure 18:
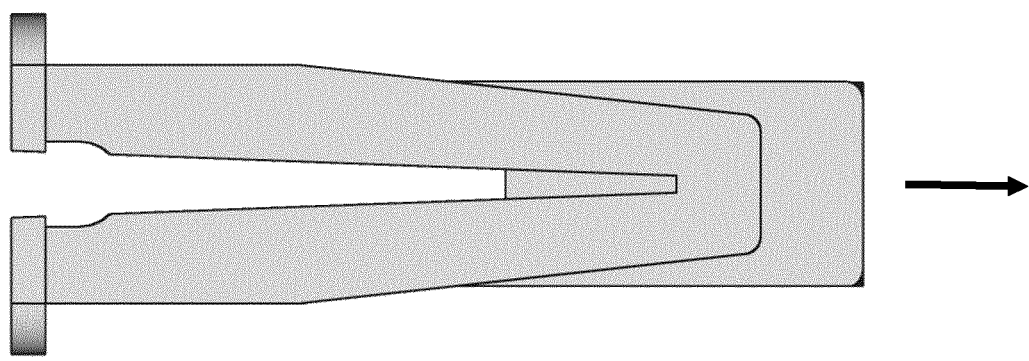
FIG. 18: shows the fourth embodiment of the wedge according to the invention as seen from above.

FIGS. 17-18 show embodiments of the wedge in respectively perspective view and as seen from above, i.e. as seen from above and towards the trapezoid plate (top view). In this embodiment, the wedge further comprises a slit extending in the length direction of the wedge, the length direction being parallel with the direction of the slidable insertion of the wedge. The direction of the slidable insertion of the wedge is also indicated by the arrow in FIGS. 17-18.

Advantageously, the slit extends from the second width edge of the wedge, i.e. the end opposite the end that is initially slidably received within an aperture, as illustrated in FIGS. 17-18. Thus, the slit extends from the second end of the wedge, which is the end comprising the beam defining the complete insertion of the wedge and which is the end of the wedge that is inserted as the last part.

As further seen from FIGS. 17-18, the slit is advantageously symmetrically placed, or placed in the middle of the width of the rectangular plate and trapezoid plate, corresponding to the middle of the beam length, such that the slit forms a mirror plane along the length direction of the wedge.

Figure 19:
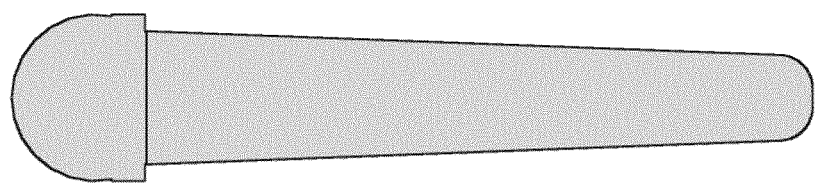
FIG. 19: shows an embodiment of an expander for the wedge according to the fourth embodiment of the invention as seen from above.
Figure 20:
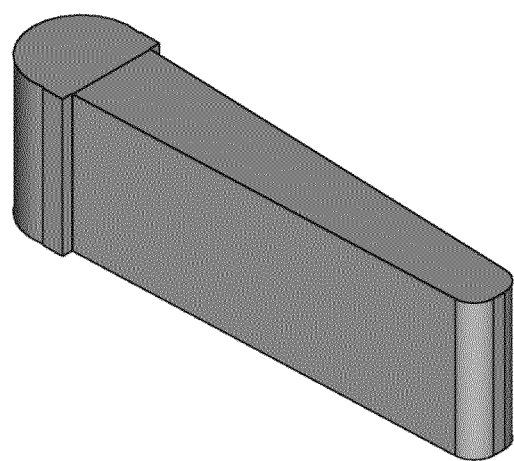
FIG. 20: shows the expander for the wedge according to the fourth embodiment of the invention in a perspective view.
Figure 21:
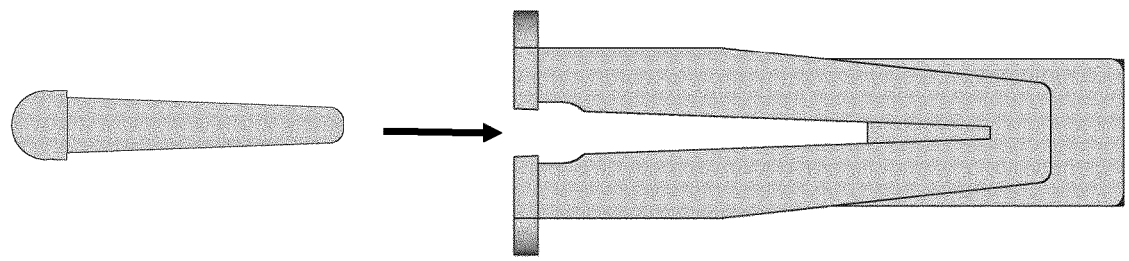
FIG. 21: shows an embodiment of the wedge according to the fourth embodiment of the invention, where the wedge comprises a slit and an expander, as seen from above.
Figure 22:
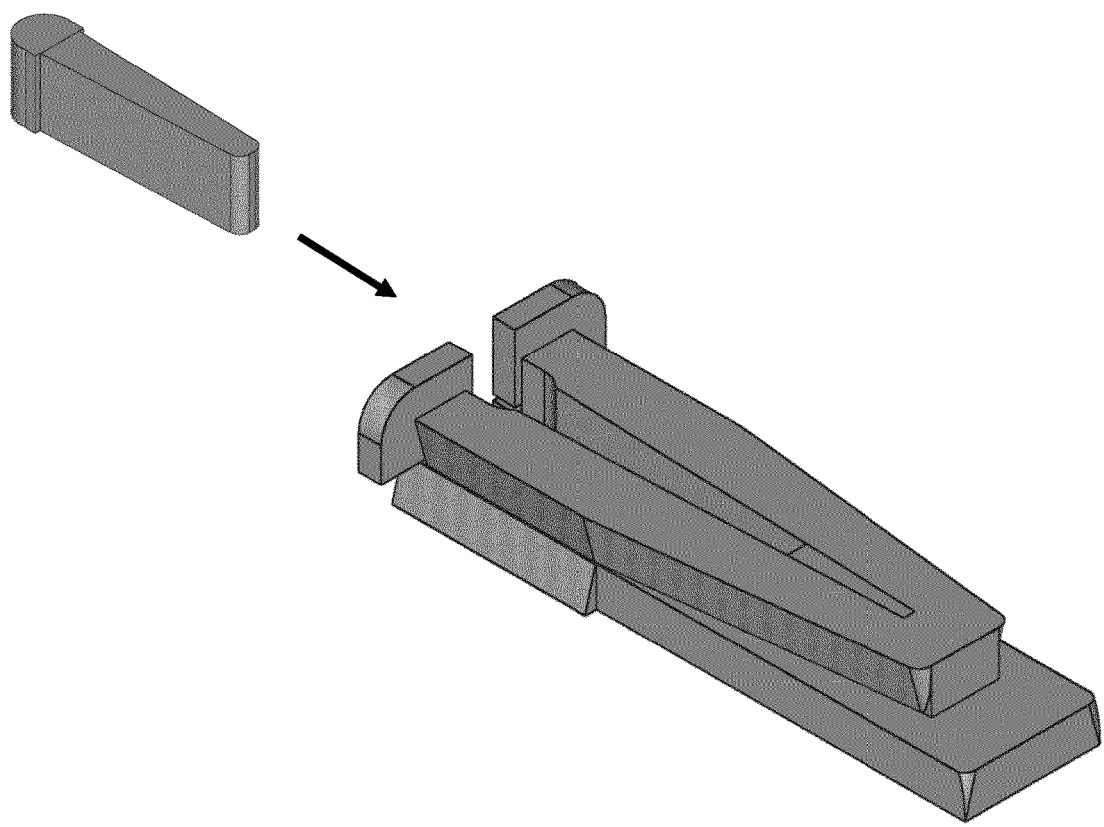
FIG. 22: shows an embodiment of the wedge according to the fourth embodiment of the invention, where the wedge comprises a slit an expander, as seen in perspective.

When the wedge according to the embodiment is inserted into a groove, the wedge is advantageously further fixed by inserting an expander into the slit. FIGS. 19-20 show embodiments of an expander in respectively top view and perspective view, and FIGS. 21-22 illustrates how the expander and wedge may be assembled by slidably inserting the expander into the slit of the wedge.

When the expander is slidably inserted into the slit, the expander may be fixed by frictional engagement between the slit and the expander. Thus, the slit and expander provides a secondary wedging effect, generating a secondary compressive force in the width plane of the rectangular plate of the wedge. This is in addition to the first frictional and compressive force which may be generated upon engagement between the wedge and a shelf plate as illustrated in FIGS. 8-9. In FIGS. 8-9, the engagement between the wedge and the shelf plate results in the horisontal shelf plate being displaced in the horisontal direction transverse to the length of the shelf plate, corresponding to the width plane of the wedge. The displacement may be limited by a back plate, as shown in FIG. 8, or a front edge of the outer frame, as shown in FIGS. 11-12, thereby generating the first frictional and compressive force.

As for all embodiments of the invention, the wedge comprising a slit provides a more simple and flexible assembly and/or disassembly and/or reassembly of any parts. The parts may be parts of a shelving unit or a shelf module as described above, and the wedge may also be used for assembling or connecting other parts, such as parts for a furniture or any construction. However due to the additional secondary frictional engagement due to the slit and expander engagement, the wedge comprising a slit provides the further advantage of an especially stable and robust assembled construction, where the risk of accidental collapse of the structure is reduced. For example, the wedge comprising slit are advantageously used for connecting parts that need to be assembled in a particular robust way, such as assembling frame plates to form a rectangular outer frame for a modular shelving unit.

A further advantage of the wedge comprising a slit is improved flexibility during assembly and disassembly. A wedge comprising a slit may be compressed in the width direction, such that the slit is closed and the width dimension of the wedge reduced. Thus, the wedge is more easily inserted into a groove, and further more easily inserted into any point along a longitudinal extending groove, as for example illustrated in FIG. 8, where a longitudinal groove 1 is shown. Since the width dimension of the wedge may be reduced by a compressive force acting perpendicular to the slit, the wedge is easily slidably inserted in the midst of a groove, as well as from the edge of the groove.

The wedge comprising a slit and expander provides simple, error-free, and easy insertion of first the wedge and then the expander. Both the wedge and the expander are configured to be slidable inserted, such that they are easily inserted without the use of excessive force, or additional tools.

The expander is fixed by frictional engagement to the slit. The frictional force depends on the contact surface, and the contact surface area. The bigger the surface area, the higher the frictional force. It is therefore advantageous that the surfaces of the expander and the slit are configured to be matching and abutting and that the contact surface in the length direction, or expander insertion direction, are larger.

Thus, advantageously, the expander has a tapered shape, and the slit has a similar tapered shape, where both are tapering in the direction of insertion. Further advantageously, the tapered shape of the slit and expander is planar. To facilitate production, insertion and handling of the expander, the expander advantageously has a columnar shape comprising two opposing planes that are parallel, and two opposing planes that are tapering, as illustrated in FIGS. 20 and 22.

Advantageously, the expander comprises a protrusion at the end opposite the tapered end that is slidably inserted. The protrusion may be configured such that this part of the expander is not inserted into the slit.

Further advantageously, the slit may have a grove below the beam, which matches the protrusion, as illustrated in FIGS. 21-22. Thus, when an expander is inserted into a first wedge, a second wedge may be used to disassemble the expander from the first wedge, by grabbing the protrusion of expander with the groove of the second wedge in the same manner as tongue-and-groove pliers. Thus, both the wedge and the expander are configured to be both slidable inserted and slidably disassemble, such that they are easily inserted and disassembled without the use of excessive force, or additional tools.

The wedge and the expander may be produced in any materials, and are advantageously made of cheap and accessible materials such as plastics, metals, wood, and combinations thereof. Examples of plastic materials include poly (methyl methacrylate) (PMMA), nylon, and polyurethane. Examples of metals include: aluminium (Al), and stainless steel.

To facilitate the insertion of first the wedge, and then the expander, the expander advantageously comprises a material that is softer than the material of the wedge. For example, the wedge may be made of nylon, and the expander may be made of polyurethane.

In an embodiment of the invention, the wedge comprises at least one slit extending in the length direction of the wedge, configured for slidably receiving an expander. In a further embodiment, the expander has a tapered shape, and the slit has a similar tapered shape, where both are tapering in the direction of insertion. In a further embodiment, the tapered shape is planar. In a further embodiment, the expander has a columnar shape comprising two opposing planes that are parallel, and two opposing planes that are tapering. In a further embodiment, the expander comprises a protrusion at the end opposite the tapered end that is slidably inserted. In a further embodiment, the slit comprises a grove below the beam, which matches the protrusion.

Items

The invention is further described by the items below.

Item 1

A T-shaped wedge for assembling a furniture unit, comprising:
- a rectangular plate, wherein the edges of the plate define a length direction and a width direction, one of said edges being the first width edge,
- a trapezoid plate, superimposed on the rectangular plate such that a first parallel edge of the trapezoid plate is adjacent to the first width edge of the rectangular plate, and wherein the non-parallel edges of the trapezoid plate are symmetrically tapered along the length direction and in the direction away from the first width edge, and
- a beam, placed at the first width edge, thereby forming the T-shape, wherein the wedge is configured for frictionally engaging two planes within the furniture unit.

Item 2

The wedge according to item 1, wherein the length of the rectangular plate is longer than the trapezoid plate.

Item 3

The wedge according to any of the preceding items, wherein the wedge is configured to be slidably received within an aperture from the end opposite the beam.

Item 4

The wedge according to any of the preceding items, wherein the edges in the length direction of the rectangular plate and/or trapezoid plate form an angle to the plane of the plates.

Item 5

The wedge according to item 4, wherein the tapered edges of the trapezoid plate form a first angle to the plane of the plates, wherein said angle preferably is between 10 to 90 degrees, more preferably between 30 to 45 degrees, and most preferably is between 60 to 80 degrees, or essentially is perpendicular to the plane of the plates.

Item 6

The wedge according to any of items 4-5, wherein the edges in the length direction of the rectangular plate form a second angle to the plane of the plates, wherein said angle preferably is between 10 to 90 degrees, more preferably between 30 to 45 degrees, and most preferably is between 60 to 80 degrees, or essentially is perpendicular to the plane of the plates.

Item 7

The wedge according to any of items 4-6, wherein the first and the second angles are reverse or mirror imaged, such that the angle formed between the planes of the tapered edges and the rectangular length edges is acute.

Item 8

The wedge according to any of the preceding items, wherein the beam is superimposed on the rectangular plate such that the beam level with the first width edge of the rectangular plate, and wherein the first parallel edge of the trapezoid plate abuts the beam.

Item 9

The wedge according to any of the preceding items, wherein the trapezoid plate cover between 10 to 90% of the rectangular plate area, more preferably between 30% to 80% or 40% to 70%, and most preferably between 50% to 60%.

Item 10

The wedge according to any of the preceding items, wherein the tapered edges are tapered in a manner selected from the group of: linear, exponential, logarithmic, and any combination thereof.

Item 11

The wedge according to any of the preceding items, wherein the tapered edges are linear and form a third angle to the length direction of the plates, wherein said angle is between 1 to 45 degrees, more preferably between 5 to 35 degrees, and most preferably between 5 to 25 degrees, or between 5 to 15 degrees.

Item 12

The wedge according to any of the preceding items, wherein the length of the rectangular plate is between 1 mm to 1 m, more preferably between 1 cm to 50 cm, 2 cm to 10 cm, or 3 cm to 7 cm, and most preferably is ca. 5 cm.

Item 13

The wedge according to any of the preceding items, wherein the trapezoid plate has a length between 1 mm to 1 m, more preferably between 5 mm to 40 cm, 2 cm to 9 cm, or 2 cm to 5 cm, and most preferably is ca. 3 cm.

Item 14

The wedge according to any of the preceding items, wherein the thickness of the rectangular plate and/or the trapezoid plate is between 1 mm to 10 cm, more preferably between 1 mm to 50 mm, 1 mm to 30 mm, or 1 mm to 10 mm, and most preferably is ca. 3 mm.

Item 15

The wedge according to any of the preceding items, comprising a material selected from the group of: plastic materials, metals, wood, and any combination thereof.

Item 16

The wedge according to any of the preceding claims, wherein the wedge is made by moulding, such as injection moulding, 3D-printing, and/or gluing.

Item 17

A kit of parts for a modular shelving unit, comprising:
a) a plurality of frame plates configured to be assembled to form a rectangular outer frame, wherein the inner surface of at least a part of the vertical outer frame plates comprises a first vertical groove,
b) one or more shelf modules, each shelf module configured to be assembled to form a horizontal shelf within said outer frame, each shelf module comprising:
   two vertical side plates, configured to be placed opposite each other, and against opposite vertical inner surfaces of the outer frame,
   a horisontal shelf plate configured to be placed on top of the two vertical side plates in a first notch-and-groove engagement with the adjacent vertical side plates, said shelf plate further comprising a second notch at each end of the shelf plate, and
c) two or more wedges of any of items 1-16, 44-48,
   wherein the modular shelving unit is configured to be assembled by installation of two or more wedges according to any of items 1-16, 44-48.

Item 18

A modular shelving unit for assembly without tools, comprising:
a) a plurality of frame plates configured to be assembled to form a rectangular outer frame, wherein the inner surface of at least a part of the vertical outer frame plates comprises a first vertical groove,
b) one or more shelf modules, each shelf module configured to be assembled to form a horisontal shelf within said outer frame, each shelf module comprising:

two vertical side plates, configured to be placed opposite each other against opposite vertical inner surfaces of the outer frame,
a horisontal shelf plate configured to be placed on top of the two vertical side plates in a first notch-and-groove engagement with the adjacent vertical side plates, said shelf plate further comprising a second notch at each end of the shelf plate,
two wedges configured to be received within the apertures formed at each end of the shelf plate between the first vertical groove of the outer frame plate and the second notch at the end of the shelf plate,
wherein the modular shelving unit is configured such that the installation of the wedge in the aperture displaces the horisontal shelf plate in the horisontal direction transverse to the width of the shelving unit, thereby stabilising the shelf module by compressing the horisontal shelf plate against the outer frame.

Item 19
The unit according to item 18, wherein the outer frame is configured to be assembled by fastening means, such as dowels and/or wedges.

Item 20
The unit according to any of items 18-19, wherein the outer frame is configured to be assembled by installation of two or more wedges according to any of claims 1-16, 44-48.

Item 21
The unit according to any of items 18-20, wherein one or more shelf modules further comprises a back plate.

Item 22
The unit according to any of items 18-21, wherein one or more of the outer frame plates further comprise an orthogonal extending edge fastened to the frame plate by fastening means, wherein the orthogonal edge optionally is made of a metal.

Item 23
The unit according to any of items 18-22, wherein each frame plate comprises an orthogonal edge fastened essentially at the middle of the frame plate.

Item 24
The unit according to any of items 18-23, wherein the orthogonal edges are configured to support the back plate.

Item 25
The unit according to any of items 18-24, wherein the first vertical groove of the frame plate have the shape of a rectangular groove.

Item 26
The unit according to any of items 18-25, wherein the second notch at each end of the shelf plate has the shape of a rectangular notch.

Item 27
The unit according to any of items 18-26, wherein the shelf plate is configured such that the second notch at each end of the shelf plate respectively opposes the oppositely placed first vertical grooves of the frame, when the horisontal shelf plate is placed on top of the vertical side plates.

Item 28
The unit according to any of items 18-27, wherein the shelf plate is configured such that the second notch at each end of the shelf plate is opposing the first vertical groove of the frame with a displacement, when the horisontal shelf plate is placed on top of the vertical side plates, and the wedges are not installed.

Item 29
The unit according to item 28, wherein the displacement is between 1 mm to 20 mm, more preferably between 1 mm to 10 mm, and most preferably between 1 mm to 4 mm.

Item 30
The unit according to any of items 18-29, wherein the shelf plate is configured such that the second notch at each end of the shelf plate is opposing the first vertical groove of the frame without a displacement, when the horisontal shelf plate is placed on top of the vertical side plates, and the wedges are installed.

Item 31
The unit according to any of items 18-30, wherein the edges of the side plates comprise a groove configured to form the first notch-and-groove engagement with the shelf plate.

Item 32
The unit according to any of items 18-31, wherein at least a part of the surface of the side plates comprises a second vertical groove.

Item 33
The unit according to item 32, wherein the second vertical grooves have the shape of a rectangular groove.

Item 34
The unit according to any of items 32-33, wherein the side plate is configured such that the second vertical groove opposes the first vertical groove of the frame, when side plate is placed against the vertical inner surface of the outer frame.

Item 35
The unit according to any of items 32-34, wherein the extension of the second vertical groove is configured such that an edge of the groove abuts an end of an installed wedge.

Item 36
The unit according to any of items 18-35, wherein one or both surface(s) of the shelf plate comprises the first groove, and extends fully or partially along one or more edges of the shelf plate.

Item 37
The unit according to item 36, wherein the first groove extend fully along a longitudinal edge of the shelf plate, and wherein the longitudinal first groove is configured to engage with the back plate in a second notch-and-groove engagement.

Item 38
The unit according to any of items 36-37, wherein the first groove extend partially along the ends of the shelf plate, and wherein said partial groove is configured to engage with the vertical side plate in the first notch-and-groove engagement.

Item 39
The unit according to item 38, wherein the partially first partial groove is configured to engage with the outer frame at the end point of the groove.

Item 40
The system according to any of items 38-39, wherein the first partial groove extend along between 50 to 99% of the transverse edge, more preferably between 60 to 90%, or 70 to 80%.

Item 41
The system according to any of the preceding items, wherein the shelf plate comprises a third notch configured to engage with a front edge of the outer frame.

Item 42
The system according to any of the preceding items, wherein the shelf plate is configured such that compression between the shelf plate and the outer frame occurs towards a back plate, and/or othogonal supports, and/or a front edge of the outer frame.

Item 43
  The system according to any of items 18-42, wherein the two or more wedges are wedges according to any of items 1-16, 44-48.
Item 44
  The wedge according to any of items 1-16, further comprising at least one slit extending in the length direction of the wedge, configured for slidably receiving an expander.
Item 45
  The wedge according to item 44, wherein the expander has a tapered shape, and the slit has a similar tapered shape, where both are tapering in the direction of insertion, and optionally the tapered shape is planar.
Item 46
  The wedge according to item 44-45, wherein the expander has a columnar shape comprising two opposing planes that are parallel, and two opposing planes that are tapering.
Item 47
  The wedge according to item 44-46, wherein the expander comprises a protrusion at the end opposite the tapered end that is slidably inserted.
Item 48
  The wedge according to item 44-47, wherein the slit comprises a grove below the beam, which matches the protrusion.

REFERENCES

[1] DE 201 14 161 U1

The invention claimed is:

1. A T-shaped wedge for assembling a furniture unit, comprising:
   a rectangular plate, wherein the edges of the plate define a length direction and a width direction,
   a trapezoid plate having a pair of non-parallel edges, superimposed on the rectangular plate such that a first parallel edge of the trapezoid plate is adjacent to a first width edge of the rectangular plate, and wherein the non-parallel edges are symmetrically tapered along the length direction and in the direction away from the first width edge, and
   a beam, placed at the first width edge, thereby forming the T-shape
   wherein the wedge is configured for frictionally engaging two planes within the furniture unit, and
   at least one slit extending in the length direction of the wedge, configured for slidably receiving an expander.

2. The wedge according to claim 1, wherein the length of the rectangular plate is longer than the trapezoid plate.

3. The wedge according to claim 1, wherein the wedge is configured to be slidably received within an aperture from the end opposite the beam.

4. The wedge according to claim 1, wherein the edges in the length direction of the rectangular plate and/or trapezoid plate form an angle to the plane of the plates.

5. The wedge according to claim 4, wherein the tapered edges of the trapezoid plate form a first angle to the plane of the plates.

6. The wedge according to claim 5, wherein the first angle is between 10 to 90 degrees.

7. The wedge according to claim 5, wherein the first angle is essentially perpendicular to the plane of the plates.

8. The wedge according to claim 4, wherein the edges in the length direction of the rectangular plate form a second angle to the plane of the plates.

9. The wedge according to claim 8, wherein the second angle is between 10 to 90 degrees.

10. The wedge according to claim 8, wherein the second angle is essentially perpendicular to the plane of the plates.

11. The wedge according to claim 8, wherein the first and the second angles are reverse or mirror imaged, such that the angle formed between the planes of the tapered edges and the rectangular length edges is acute.

12. The wedge according to claim 1, wherein the beam is superimposed on the rectangular plate such that the beam is level with the first width edge of the rectangular plate, and wherein the first parallel edge of the trapezoid plate abuts the beam.

13. The wedge according to claim 1, comprising a material selected from the group of: plastic materials, metals, wood, and any combination thereof, and/or wherein the wedge is made by molding.

14. A kit of parts for a modular shelving unit, comprising:
   a) a plurality of frame plates configured to be assembled to form a rectangular outer frame, wherein an inner surface of at least a part of a vertical outer frame plate comprises a first vertical groove,
   b) one or more shelf modules, each shelf module configured to be assembled to form a horizontal shelf within said outer frame, each shelf module comprising:
      two vertical side plates, each configured to be placed opposite each other against an opposite vertical inner surface of the outer frame,
      a horizontal shelf plate configured to be placed on top of the two vertical side plates in a first notch-and-groove engagement with adjacent vertical side plate, said shelf plate further comprising a second notch at each end of the shelf plate, and
   c) two or more wedges of claim 1,
   wherein the modular shelving unit is configured to be assembled by installation of two or more wedges according to claim 1.

15. A modular shelving unit for assembly without tools, comprising:
   a) a plurality of frame plates configured to be assembled to form a rectangular outer frame, wherein an inner surface of at least a part of a vertical outer frame plate comprises a first vertical groove,
   b) one or more shelf modules, each shelf module configured to be assembled to form a horizontal shelf within said outer frame, each shelf module comprising:
      two vertical side plates, each configured to be placed opposite each other against an opposite vertical inner surface of the outer frame,
      a horizontal shelf plate configured to be placed on top of the two vertical side plates in a first notch-and-groove engagement with an adjacent vertical side plate, said shelf plate further comprising a second notch at each end of the shelf plate,
      two wedges configured to be received within apertures formed at each end of the shelf plate between the first vertical groove of the outer frame plate and the second notch at the end of the shelf plate,
   wherein the modular shelving unit is configured such that the installation of the wedge in the aperture displaces the horizontal shelf plate in the horizontal direction transverse to the width of the shelving unit, thereby stabilizing the shelf module by compressing the horizontal shelf plate against the outer frame.

16. The unit according to claim 15, wherein the outer frame comprises one or more dowels and/or wedges configured for assembling the outer frame.

17. The unit according to claim 15, wherein the first vertical groove of the frame plate has the shape of a rectangular groove, and/or the second notch at each end of the shelf plate has the shape of a rectangular notch.

18. The unit according to claim 15, wherein the shelf plate is configured such that the second notch at each end of the shelf plate respectively opposes the oppositely placed first vertical grooves of the frame, when the horizontal shelf plate is placed on top of the vertical side plates.

19. The unit according to claim 15, wherein the shelf plate is configured such that the second notch at each end of the shelf plate is opposing the first vertical groove of the frame without a displacement, when the horizontal shelf plate is placed on top of the vertical side plates, and the wedges are installed.

\* \* \* \* \*